(12) United States Patent
Nakamura et al.

(10) Patent No.: US 6,677,930 B2
(45) Date of Patent: *Jan. 13, 2004

(54) MOUSE

(75) Inventors: Shuji Nakamura, Tokyo (JP); Masanobu Hayama, Tokyo (JP); Tamotsu Koike, Tokyo (JP)

(73) Assignee: Fujitsu Takamisawa Component LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 238 days.

(21) Appl. No.: 09/273,455

(22) Filed: Mar. 22, 1999

(65) Prior Publication Data

US 2002/0044133 A1  Apr. 18, 2002

(30) Foreign Application Priority Data

Apr. 1, 1998 (JP) ............................................. 10-088894
Oct. 30, 1998 (JP) ............................................. 10-310815

(51) Int. Cl.$^7$ ................................................. G09G 5/08
(52) U.S. Cl. .................. 345/163; 178/18.01; 178/18.03
(58) Field of Search ................................. 345/163, 157, 345/174, 158, 166, 156, 173; 340/710; 178/18.01, 18.03, 18.06, 18.07

(56) References Cited

U.S. PATENT DOCUMENTS

| | | | | |
|---|---|---|---|---|
| 5,095,303 A | | 3/1992 | Clark et al. ................. 340/710 |
| 5,446,481 A | | 8/1995 | Gillick et al. ................ 345/163 |
| 5,473,344 A | | 12/1995 | Bacon et al. ................ 345/163 |
| 5,508,719 A | * | 4/1996 | Gervais ...................... 345/157 |
| 5,530,455 A | | 6/1996 | Gillick et al. ................ 345/163 |
| 5,585,619 A | * | 12/1996 | Goto et al. .............. 250/206.2 |
| 5,598,183 A | | 1/1997 | Robertson et al. .......... 345/145 |
| 5,611,040 A | | 3/1997 | Brewer et al. .............. 395/326 |
| 5,764,218 A | * | 6/1998 | Della Bona et al. ........ 345/157 |
| 5,805,144 A | * | 9/1998 | Scholder et al. ............ 345/163 |
| 5,861,583 A | * | 1/1999 | Schediwy et al. ....... 178/18.06 |
| 5,910,798 A | * | 6/1999 | Kim ........................... 345/163 |
| 5,982,302 A | * | 11/1999 | Ure ............................. 345/163 |
| 6,025,832 A | * | 2/2000 | Sudo et al. .................. 345/158 |
| 6,313,825 B1 | * | 11/2001 | Gilbert ........................ 345/156 |

* cited by examiner

Primary Examiner—Vijay Shankar
(74) Attorney, Agent, or Firm—Staas & Halsey LLP

(57) ABSTRACT

A mouse for a computer has a small touch panel to realize improved functions. The mouse (40) has a lower case (41) and an upper case (42) that covers an upper part of the lower case. A front part of the upper case has an integrated support. The touch panel is installed on the support, and a key top (43) is fitted to the upper case to fix the touch panel. An instruction is generated according to a finger touching period or the movement of a finger on the touch panel, and the instruction is transmitted to the computer, to thereby realize the improved functions. The touch panel may be divided into sections, and some of the sections may be used as switches, to thereby eliminate click switches from the mouse.

15 Claims, 28 Drawing Sheets

Fig. 8
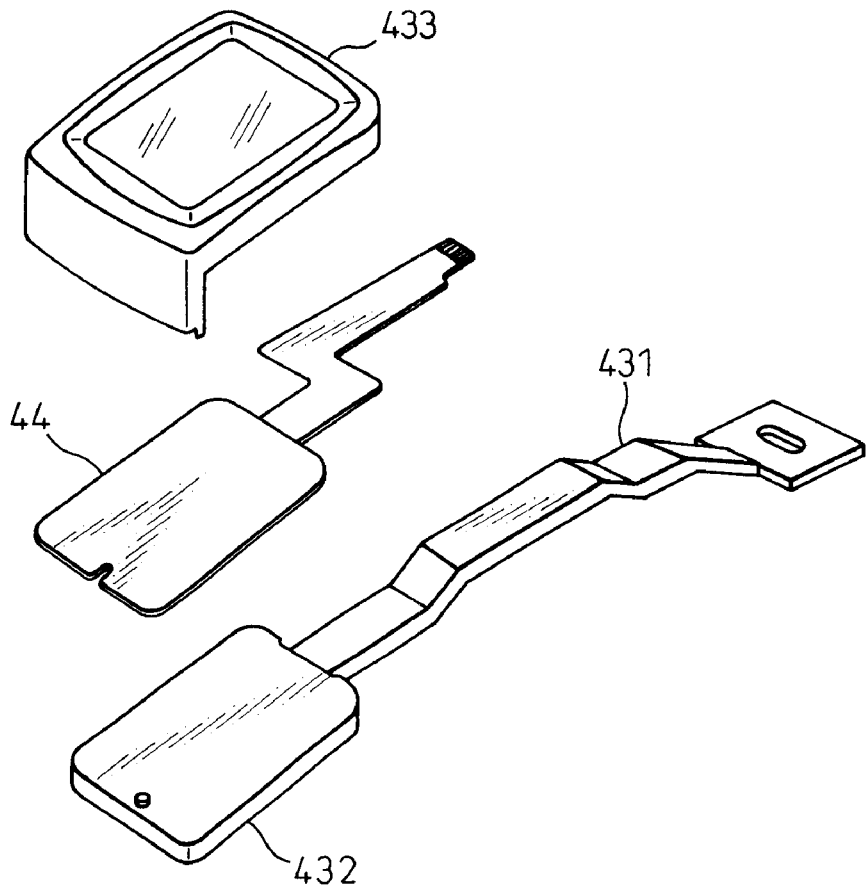
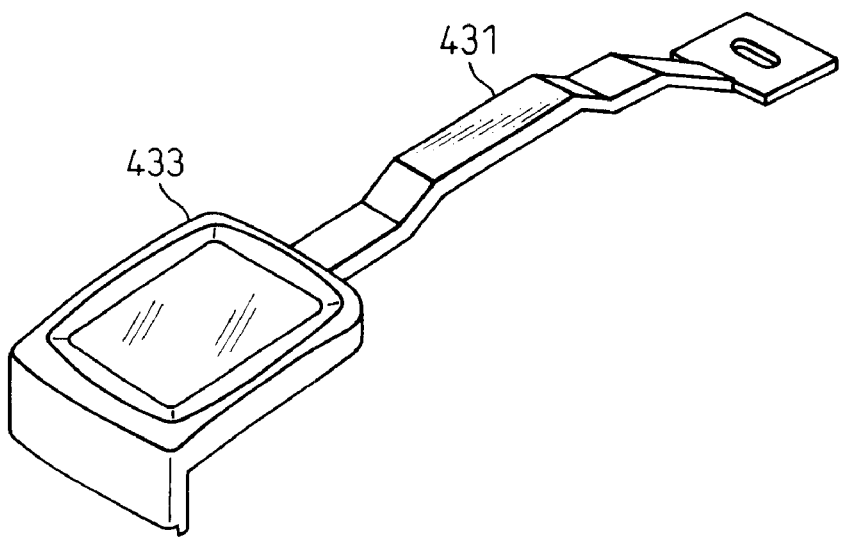

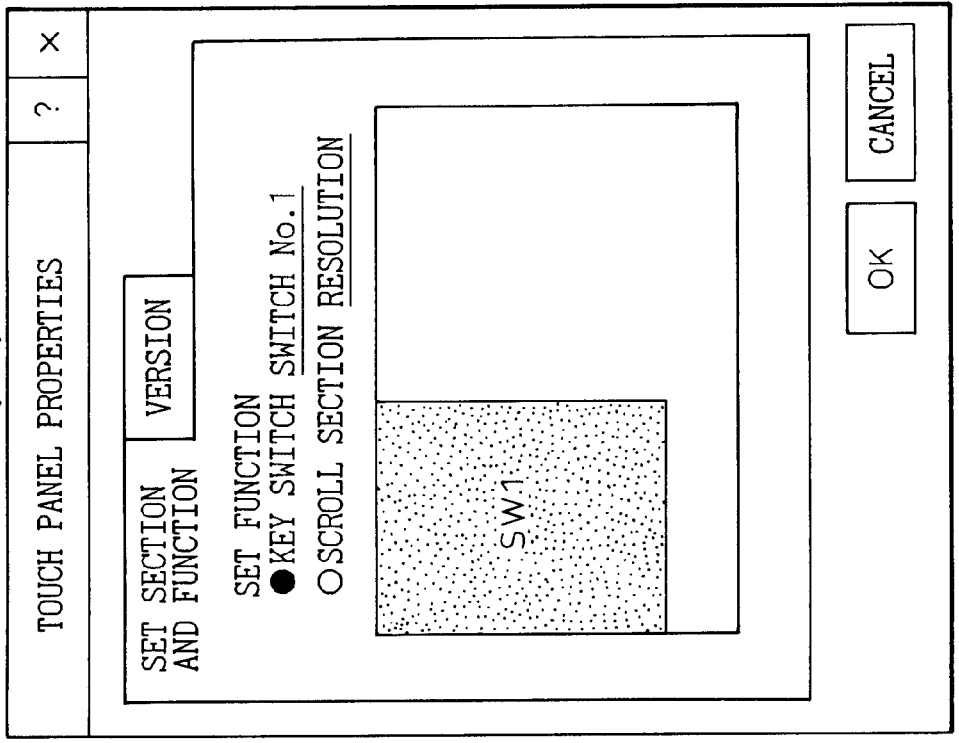
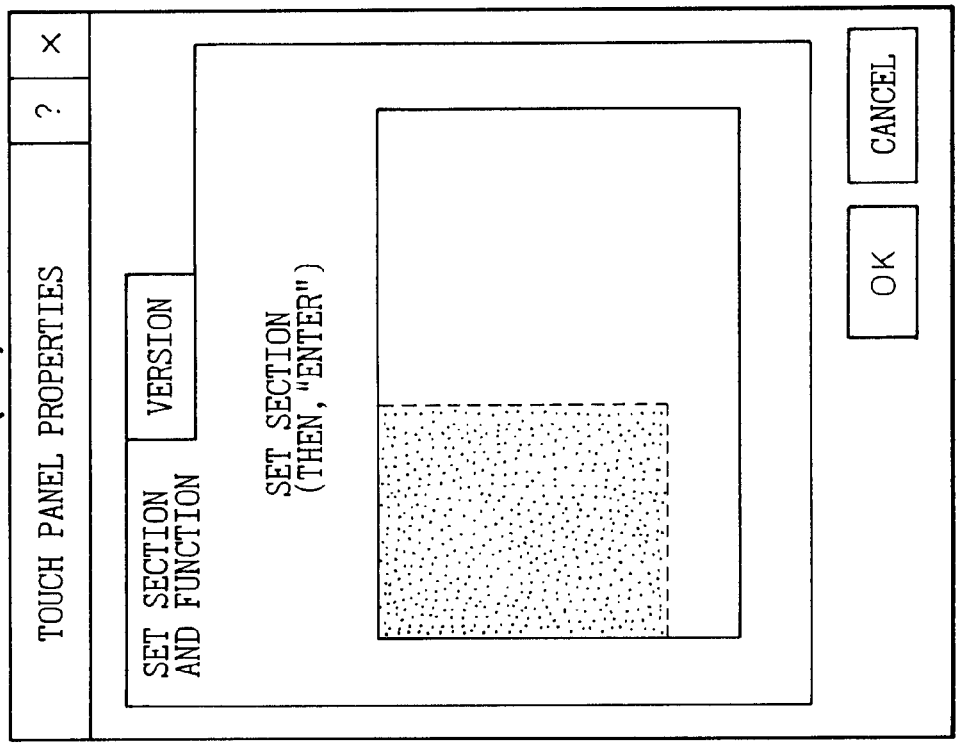
Fig. 25

Fig. 27

| | |
|---|---|
| STARTER | |
| 0 | UPPER-LEFT X-COORDINATE OF SECTION 1 |
| 0 | UPPER-LEFT Y-COORDINATE OF SECTION 1 |
| 3 | LOWER-RIGHT X-COORDINATE OF SECTION 1 |
| 7 | LOWER-RIGHT Y-COORDINATE OF SECTION 1 |
| 1 | SECTION No. |
| 0.0 | CORRECTION COEFFICIENT |
| 3 | |
| 0 | |
| 7 | |
| 7 | |
| 2 | |
| 4 | |
| 7 | |
| 0 | |
| 10 | |
| 7 | |
| 3 | |
| 0 | |
| 0 | |
| 7 | |
| 10 | |
| 10 | |
| 4 | |
| 3 | |
| TERMINATOR | |

SECTION 1: rows 0, 0, 3, 7, 1, 0.0
SECTION 2: rows 3, 0, 7, 7, 2, 4
SECTION 3: rows 7, 0, 10, 7, 3, 0
SECTION 4: rows 0, 7, 10, 10, 4, 3

MOUSE

BACKGROUND OF THE INVENTION

1. Field of the Invention

The present invention relates to a mouse serving as a pointing device for personal computers (PCs), and particularly, to a mouse having improved functions.

2. Description of the Related Art

To improve the operability of PCs, GUIs (graphical user interfaces) have been adopted. Mice are widely used as pointing devices to point to icons in GUIs.

Most mice are designed to inform PCs of the X- and Y-movements of the mice and the operations of two click switches of the mice.

FIG. 1 shows the principle of a conventional mouse. A ball 10 turns in response to user's manipulation. The ball 10 is in contact with an X-axis roller 11 and a Y-axis roller 12 that are orthogonal to each other.

The rollers 11 and 12 have disks 13 and 14, respectively. The disks 13 and 14 have slits formed at regular intervals and turn in respond to the rotation of the ball 10.

A presser roller 15 is arranged at an angle of 45 degrees with respect to the rollers 11 and 12 to keep the ball 10 and rollers 11 and 12 touching each other.

An X-axis light emitter 16 and an X-axis photodetector 17 are arranged on the opposite sides of the disk 13, and a Y-axis light emitter 18 and a Y-axis photodetector 19 are arranged on the opposite sides of the disk 14.

FIG. 2 shows four sides of the mouse. A lower case 21 and an upper case 22 are fitted together, and a key top 23 is attached to the upper case 22.

FIG. 3 shows the structure of the mouse. The photodetectors 17 and 19 are connected to a controller 31 contained in the mouse. A right click switch 231 and a left click switch 232, which are arranged in the key top 23, are also connected to the controller 31. The controller 31 consists of a microprocessor to count pulses from the photodetectors 17 and 19, monitor operations on the click switches 231 and 232, format the pulse counts and click-switch operations, and transfer the formatted data to a PC.

The mouse detects its own movements along the X- and Y-axes, to accordingly move a mouse cursor on a display. If the click switches 231 and 232 are operated with the mouse cursor on an icon on the display, an operation corresponding to the icon is carried out.

To vertically or horizontally scroll an image on the display, the mouse cursor must be moved to a scroll bar on the display and the click switches 231 and 232 must be manipulated. Alternatively, the mouse must be repeatedly moved vertically or horizontally. These operations are laborious.

SUMMARY OF THE INVENTION

An object of the present invention is to provide a mouse having a small touch panel between or instead of click switches to improve and simplify the operation of the mouse.

In order to accomplish the object, a first aspect of the present invention provides a mouse for a computer, having a movement detector for detecting a movement of the mouse, an operation detector for detecting an operation on click switches of the mouse, a touch detector with a control surface such as a touch panel, for detecting a touched state of the control surface, and a transmitter for transmitting a set of commands prepared from the detected movement, operation, and touched state to the computer.

The mouse of the first aspect sends commands to the computer according to not only the movement and click operation of the mouse but also the movement of a finger on the control surface.

A second aspect of the present invention provides the touch detector with a timer for measuring a finger touching period on the control surface and a command generator for generating one of at least two different commands for the computer depending on the measured finger touching period.

The second aspect enables the mouse to send different commands to the computer depending on the length of time a finger touches the control surface.

A third aspect of the present invention makes the command generator recognize a tapping operation if the measured finger touching period is shorter than a threshold.

The third aspect makes the command generator issue a command corresponding to a tapping operation if the finger touching period is shorter than the threshold.

A fourth aspect of the present invention makes the command generator generate one of at least two different commands for the computer depending on the detected touched state if the measured finger touching period is longer than a threshold.

The fourth aspect makes the command generator issue one of at least two commands to the computer depending on the movement of a finger if the finger touching period is longer than the threshold.

A fifth aspect of the present invention provides a mouse for a computer, having a movement detector for detecting a movement of the mouse, a touch detector with a control surface such as a touch panel, for detecting a touched state of the control surface, and a transmitter for transmitting a set of commands prepared from the detected movement and touched state to the computer.

The fifth aspect makes the mouse issue commands to the computer in response to not only the movements of the mouse but also the movements of a finger on the control surface.

A sixth aspect of the present invention provides a mouse for a computer, having a movement detector for detecting a movement of the mouse, a touch detector with a control surface such as a touch panel, for detecting a touched state of each of sections defined on the control surface, and a transmitter for transmitting a set of commands prepared from the detected movement and touched states to the computer.

The sixth aspect makes the mouse issue commands to the computer in response to not only the movement of the mouse but also the movement of a finger in the sections defined on the control surface.

A seventh aspect of the present invention provides the mouse with a divider for dividing the control surface into sections and a memory for storing data about the sections.

The seventh aspect properly divides the control surface into sections so that different commands may be issued from the sections.

An eighth aspect of the present invention makes the memory store data for each of the sections, to indicate whether the section functions as a switch or a movement detector.

The eight aspect uses the sections defined on the control surface as switches and movement detectors.

A ninth aspect of the present invention installs the touch detector on a support that is integral with an upper case that covers an upper rear part of the mouse and fixes the periphery of the touch detector to the mouse with a window frame of a key top that covers an upper front part of the mouse.

The ninth aspect fixes the touch detector with the support that is integral with the upper case of the mouse and with the window frame of the key top of the mouse.

A tenth aspect of the present invention provides the upper case and key top with projections and recesses that engage with each other to fix the touch detector to the support.

The tenth aspect configures the mouse so that the touch detector is fixed to the support when the key top and upper case are assembled together.

An eleventh aspect of the present invention installs the touch detector on a backing plate and fixes the periphery of the touch detector to the mouse with a window frame that is formed at a front end of a plate spring that is inserted into the upper case of the mouse.

The eleventh aspect forms the touch detector as a discrete part.

A twelfth aspect of the present invention forms projections and recesses at the front ends of the backing plate and window frame. When the mouse is assembled, the projections and recesses engage with each other to fix the touch detector to the backing plate.

The twelfth aspect configures the mouse so that the touch detector is fixed to the backing plate when the backing plate and window frame are assembled together.

A thirteenth aspect of the present invention forms grooves at regular intervals on the support or backing plate.

The thirteenth aspect forms the grooves to prevent a deposition of dust on the support or backing plate.

A fourteenth aspect of the present invention forms protrusions at given intervals along at least one side of the window frame.

The fourteenth aspect forms the protrusions so that a user may sense the movement of a user's finger on the control surface.

A fifteenth aspect of the present invention forms protrusions along opposite sides of the window frame at different intervals.

The fifteenth aspect forms the protrusions of different intervals so that a user may sense the movement of a user's finger on the control surface at the different intervals.

A sixteenth aspect of the present invention forms protrusions at given intervals on the control surface.

The sixteenth aspect forms the protrusions on the control surface so that a user may sense the movement of a user's finger on the control surface.

A seventeenth aspect of the present invention provides the mouse with a correction coefficient calculator. The calculator calculates a correction coefficient according to data obtained when a predetermined point on the control surface is pushed. The correction coefficient is used to correct the coordinates of a pushed point on the control surface.

The seventeenth aspect employs the correction coefficient to correct an error in the position of a pushed point on the control surface due to installation errors of the touch detector.

BRIEF DESCRIPTION OF THE DRAWINGS

FIG. 8 shows a structure for installing a touch panel on the mouse of the first embodiment;

FIG. 25 shows a GUI for setting the touch panel of the second embodiment;

FIG. 27 shows a data format for setting the touch panel of the second embodiment;

DESCRIPTION OF THE PREFERRED EMBODIMENTS

Figure 1:
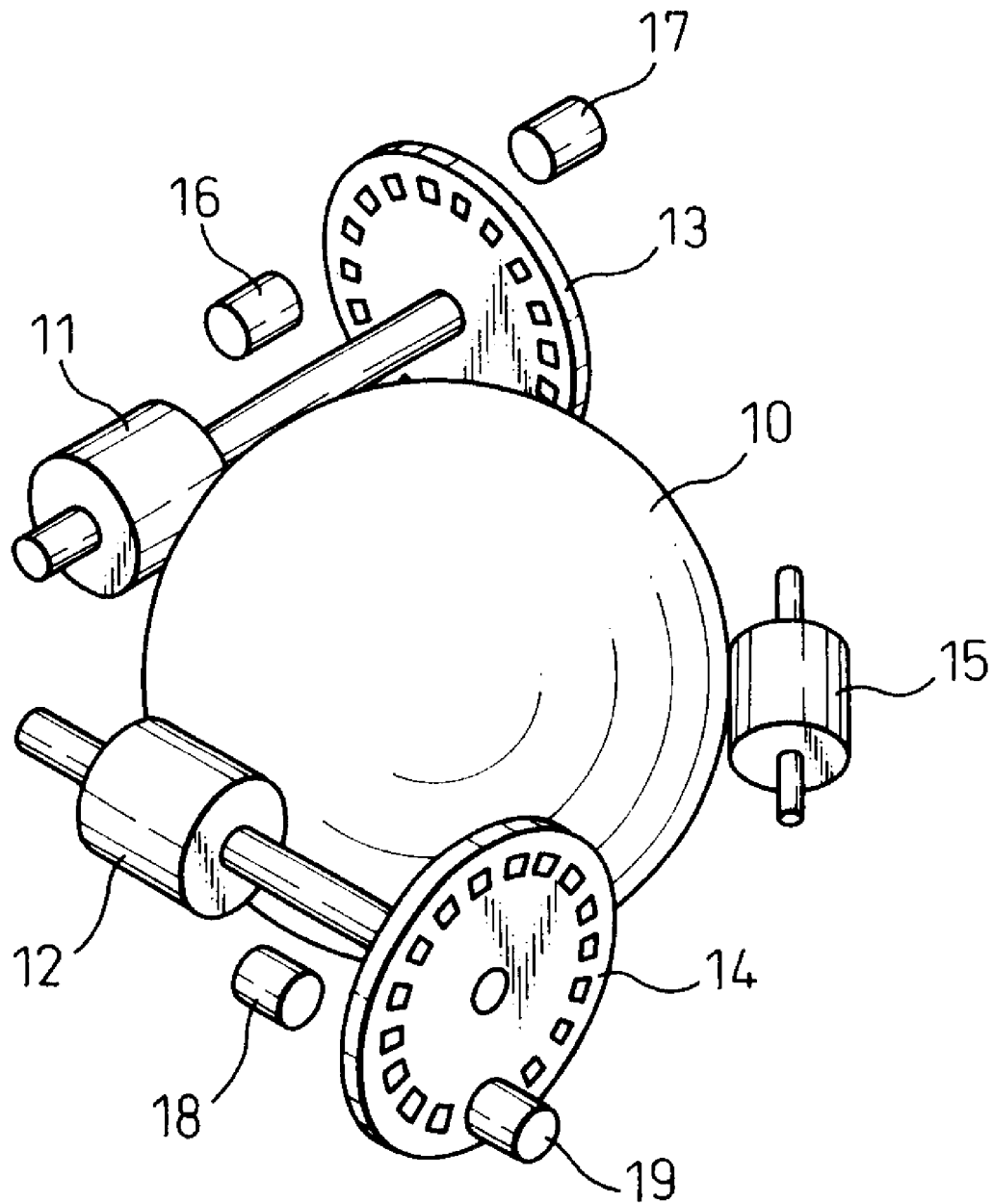
FIG. 1 shows the principle of a mouse according to a prior art.
Figure 2:
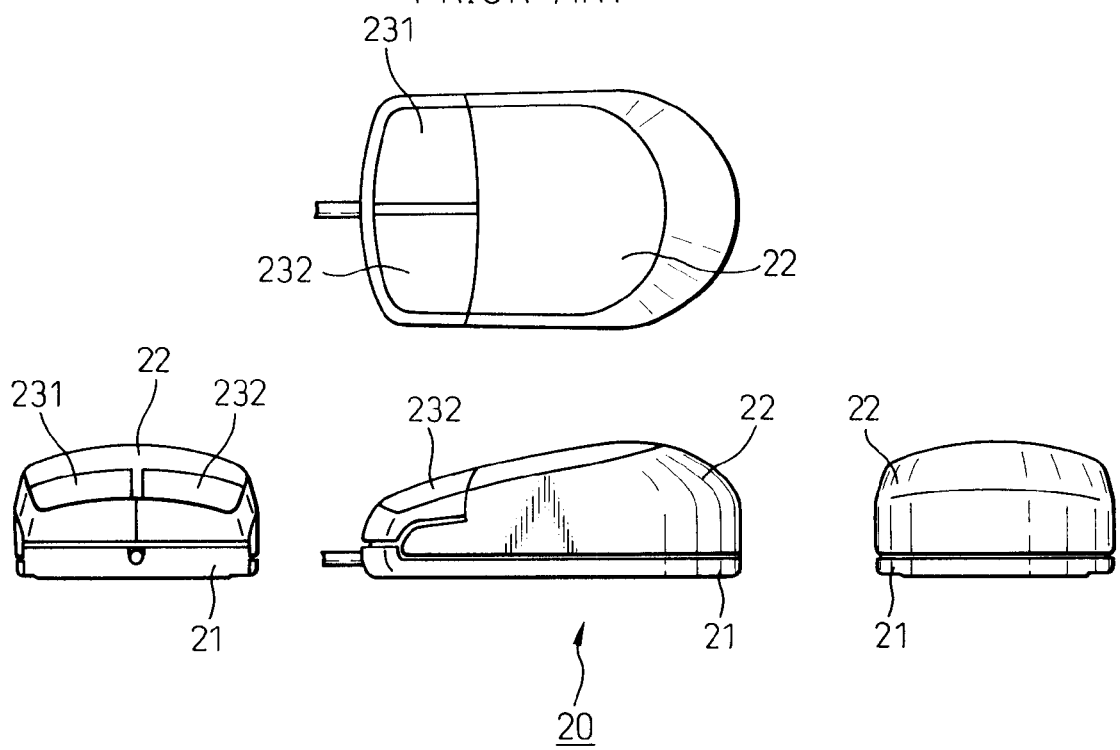
FIG. 2 shows four sides of the mouse of the prior art.
Figure 3:
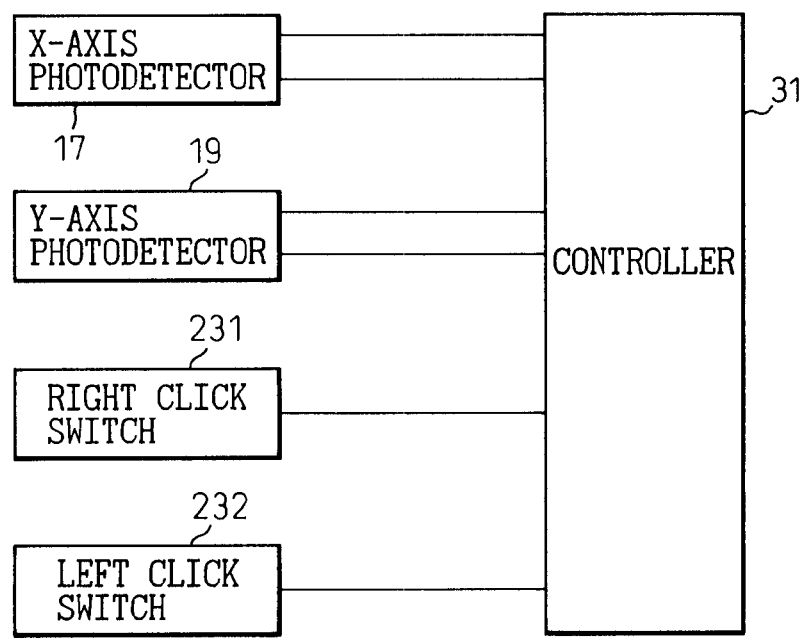
FIG. 3 shows a structure of the mouse of the prior art.
Figure 4:
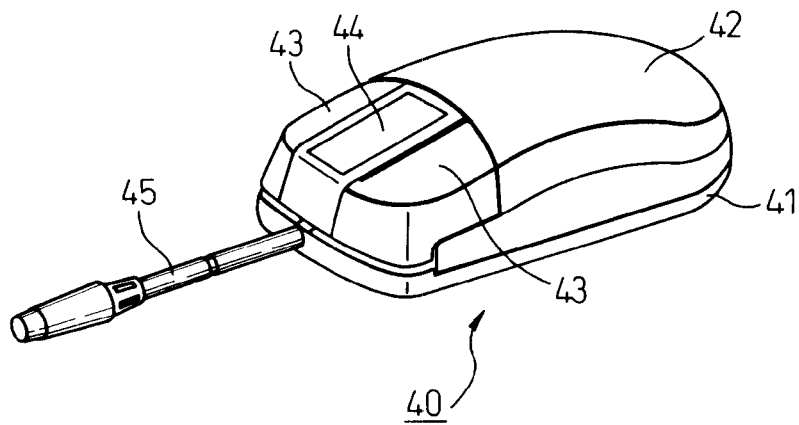
FIG. 4 shows a mouse according to a first embodiment of the present invention.
Figure 5:
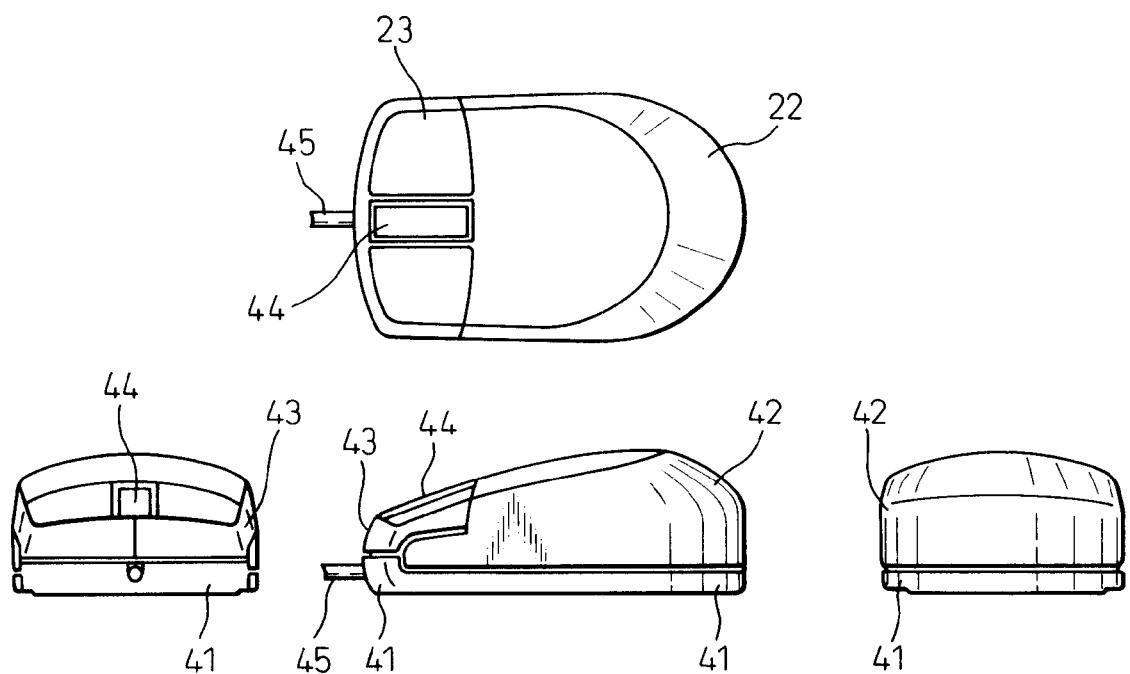
FIG. 5 shows four sides of the mouse of the first embodiment.

FIG. 4 shows a mouse 40 according to the first embodiment of the present invention, and FIG. 5 shows four sides of the mouse 40. The mouse 40 has a lower case 41, an upper case 42 that covers the rear of the lower case 41, and a key top 43 that covers the front of the lower case 41 and accommodates left and right click switches.

The key top 43 has a center window to hold a touch panel 44 serving as a control surface. A cable 45 transmits control signals from the mouse 40 to a PC.

Figure 6:
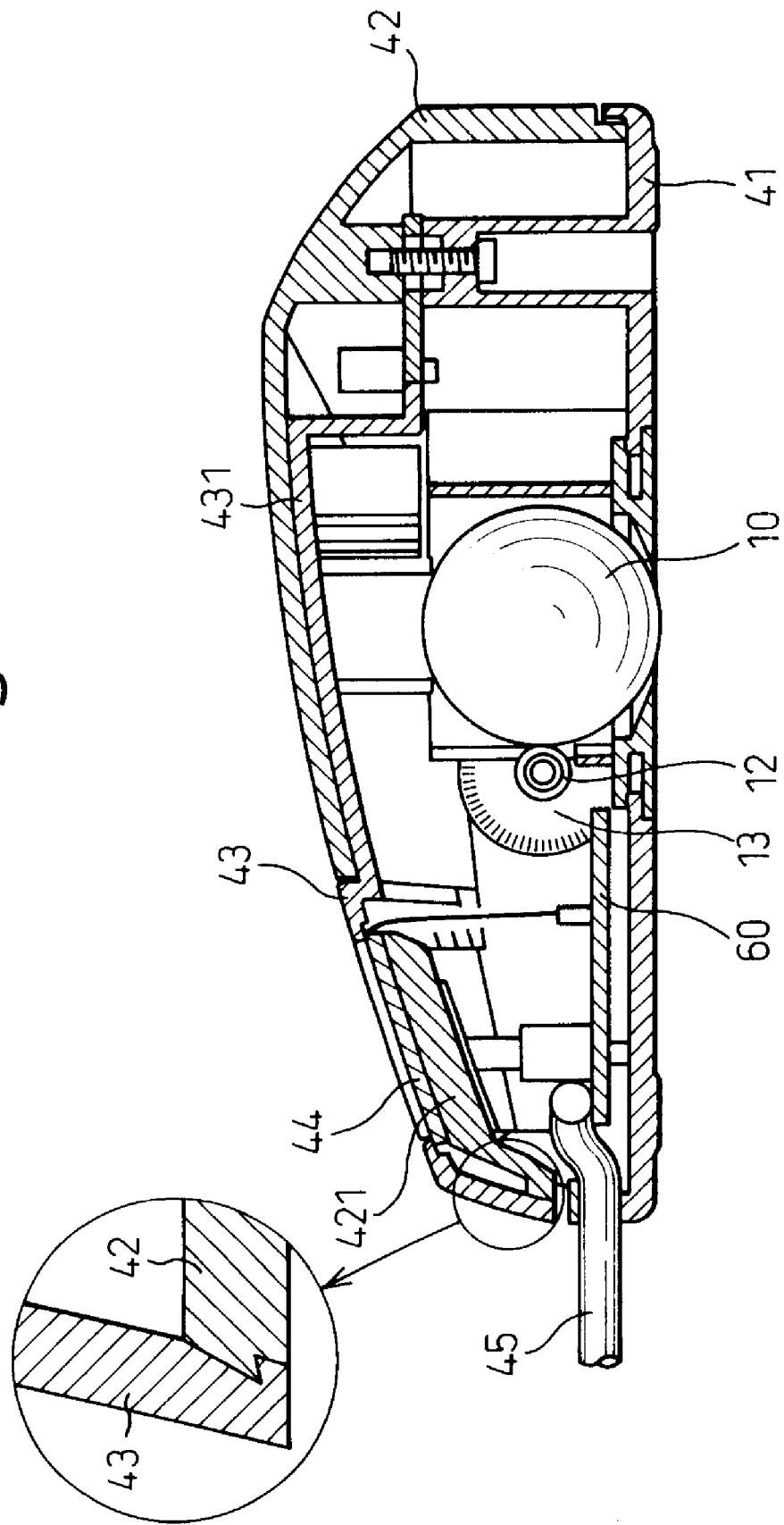
FIG. 6 shows a sectional side view of the mouse of the first embodiment.
Figure 7:
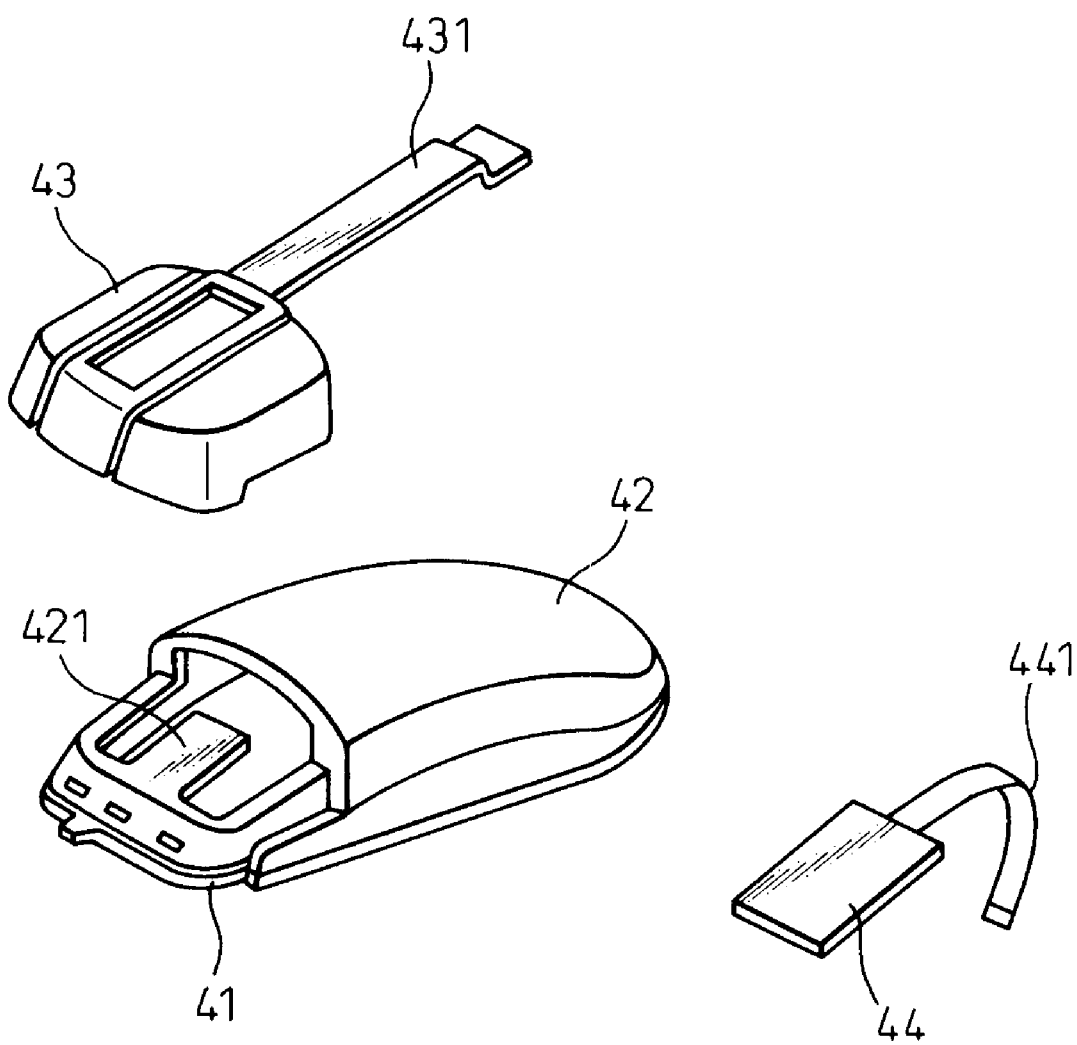
FIG. 7 shows an exploded view of the mouse of the first embodiment.

FIG. 6 shows a sectional side view of the mouse 40 and FIG. 7 shows an exploded view thereof. The lower case 41 houses a ball 10, a Y-axis roller 12, a Y-axis slit disk 14, and a circuit board 60. Also arranged in the lower case 41 are an X-axis roller 11 and an X-axis slit disk 13, which are not shown in FIG. 6.

The front center of the upper case 42 engages with the lower case 41 and has a support 421 for supporting the touch panel 44. The touch panel 44 is connected to a flat cable 440 having a front insert. After the touch panel 44 is installed on the support 421, the insert of the flat cable 440 is inserted into a receptacle (not shown) of the circuit board 60, to electrically connect the touch panel 44 to the circuit board 60.

The key top 43 has a plate spring 431. After the touch panel 44 is installed on the support 421, the plate spring 431 is inserted into the upper case 42 while the key top 43 is being fitted to the upper case 42. The touch panel 44 is fixed to the mouse 40 with a window frame formed at the center of the key top 43.

An enlarged view in FIG. 6 shows an engaged part between the upper case 42 and key top 43. At the engaged part, the upper case 42 has wedge-like projections engaging with recesses of the key top 43.

The key top 43 is fitted to the upper case 42 from above, and the engaging part of the key top 43 deforms due to the resiliency of the key top and advances over the projections of the upper case 42. When the recesses of the key top 43 engage with the projections of the upper case 42, the deformation of the key top is reduced to enforce the engagement between the key top 43 and the upper case 42.

Figure 9:
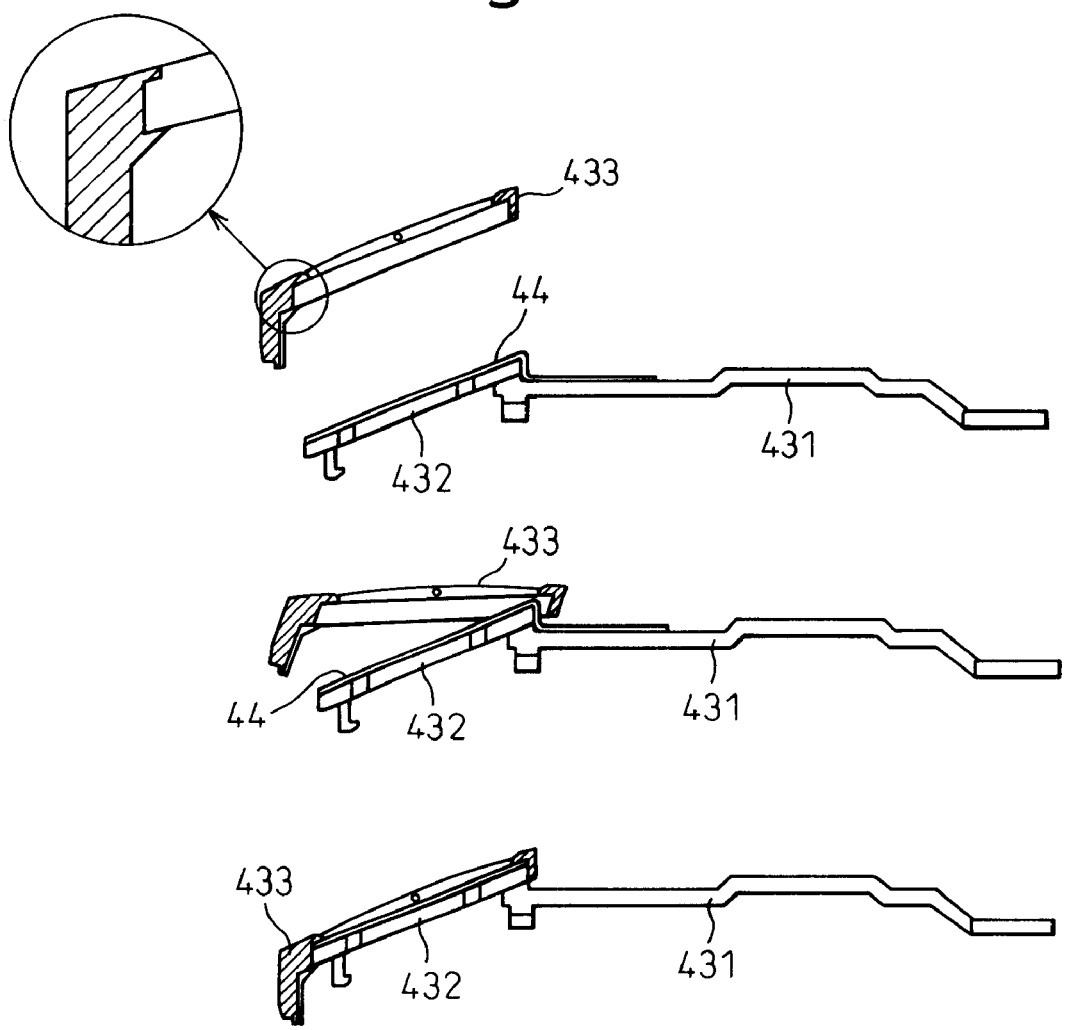
FIG. 9 shows a procedure for assembling the structure of FIG. 8.

FIG. 8 shows a structure for installing the touch panel 44 on the mouse 40, and FIG. 9 shows a procedure for assembling the structure of FIG. 8.

A plate spring 431 has a front end provided with a backing plate 432. The touch panel 44 is installed on the backing plate 432 and is covered with a frame 433.

A process of fitting the frame 433 will be explained with reference to FIG. 9. The touch panel 44 is on the backing plate 432. A rear end of the frame 433 is fitted to a rear end of the backing plate 432, and a front end of the frame 433 is fitted to a front end of the backing plate 432.

In an enlarged view of FIG. 9, a front bottom of the frame 433 has a wedge-like hook to firmly fix the frame 433, backing plate 432, and touch panel 44 together.

Figure 10:
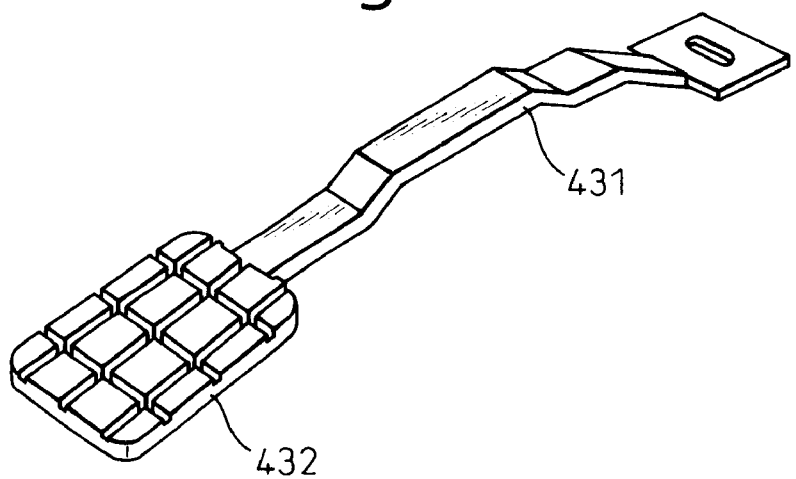
FIG. 10 shows grooves formed on a backing plate for the touch panel.

FIG. 10 shows grooves formed at proper pitches on the backing plate 432.

The grooves prevent a deposition of dust on the touch panel 44.

Figure 11:
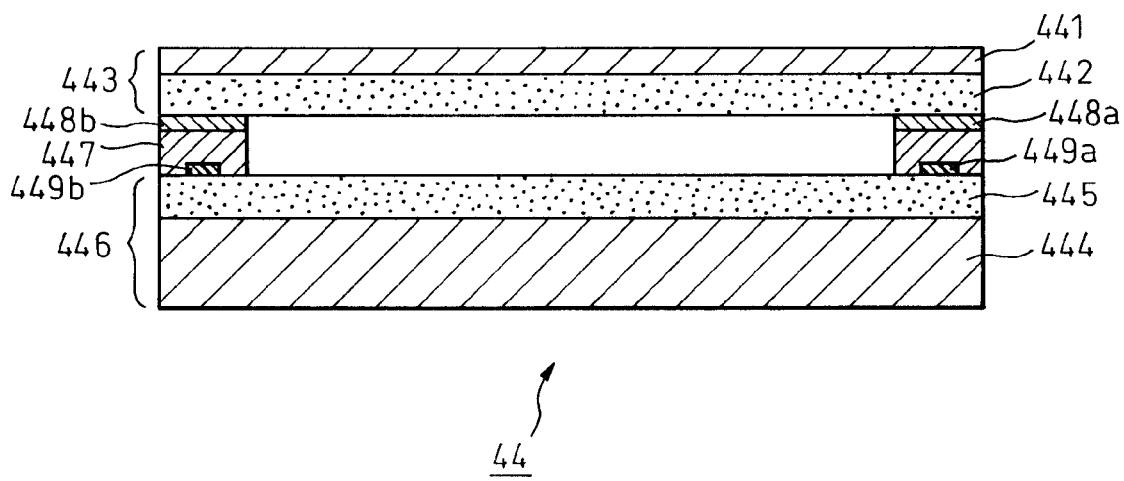
FIG. 11 shows a sectional view of a touch panel according to the present invention.

FIG. 11 shows a sectional view of the touch panel 44. The touch panel 44 consists of an upper film 443 and a lower film 446. The upper film 443 is made of an elastic film 441 and a resistance film 442 coated over the bottom face of the film 441. The lower film 446 is made of a substrate 444 and a resistance film 445 coated over the top face of the substrate 444.

The upper and lower films 443 and 446 face each other with a gap between them. The peripheries of the films 443 and 446 are supported with an insulation material 447. On the insulation material 447, there are arranged upper electrodes 448a and 448b that are electrically in contact with the resistance film 442. Under the insulation material 447, there are arranged lower electrodes 449a and 449b that are electrically in contact with the resistance film 445.

Figure 12:
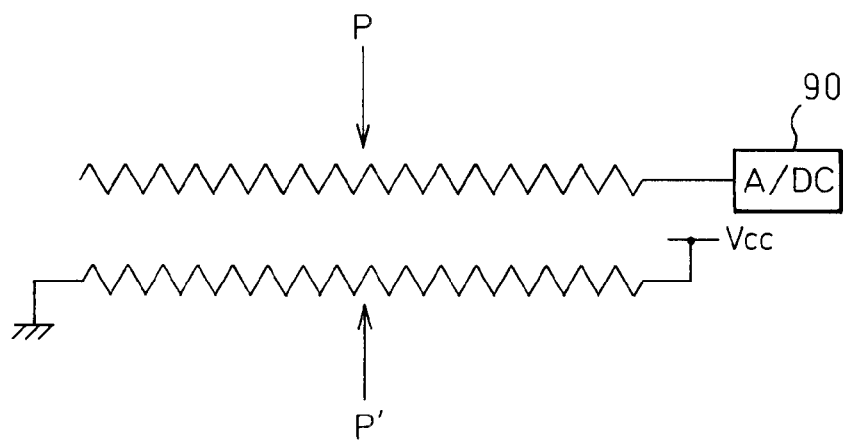
FIG. 12 shows an operation principle of the touch panel of FIG. 11.

FIG. 12 shows the principle of a pushed position detection operation by the touch panel 44. When the upper film 443 is pushed at a point P, the resistance film 442 comes into contact with the resistance film 445 at a point P'.

The lower electrode 449a is connected to a DC power source Vcc, and the other lower electrode 449b is grounded. The upper electrodes 448a and 448b are connected to an A/D converter 90.

The lower electrodes 449a and 449b are separated from each other by a distance X, and the grounded lower electrode 449b is away from the point P' by a distance x. The A/D converter 90 measures a voltage Vx that is proportional to a distance between the pushed position and the grounded lower electrode 449b as follows:

$$Vx = (x/X) \cdot Vcc$$

A voltage Vy at the pushed position in a Y-direction is detected as follows:

$$Vy = (y/Y) \cdot Vcc$$

where y is a distance between the pushed position and a grounded Y-axis electrode, and Y is a distance between two Y-axis electrodes. As a result, the coordinates (x, y) of the pushed position are calculated as follows:

$$x = (Vx/Vcc) \cdot X$$

$$y = (Vy/Vcc) \cdot Y$$

Figure 13:
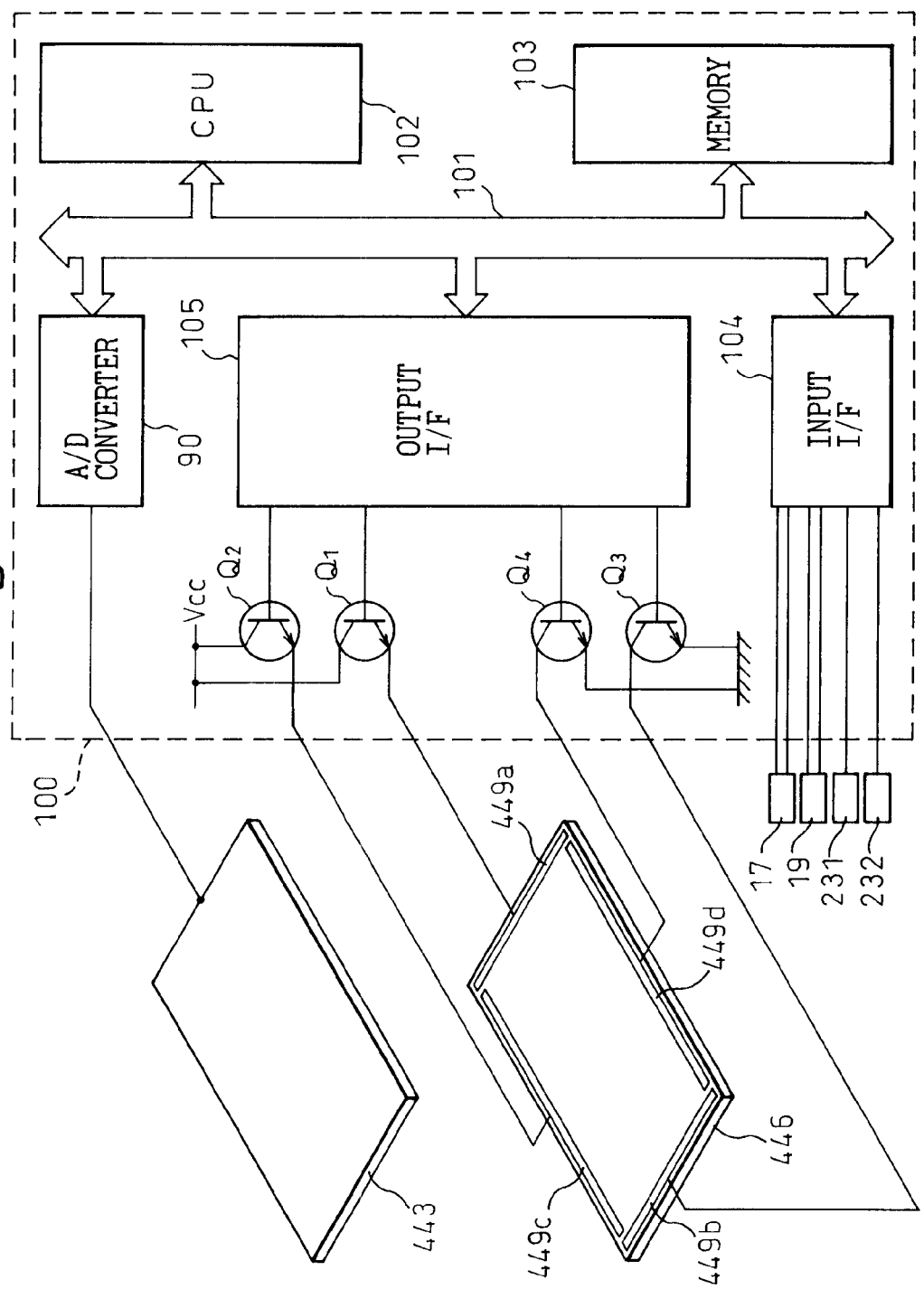
FIG. 13 shows a structure of the mouse of the first embodiment.

FIG. 13 shows the structure of the mouse 40 of the first embodiment. A controller 100 is a microcomputer and has a bus 101, a CPU 102, a memory 103, an input interface 104, an output interface 105, and the A/D converter 90. The bus 101 connects these parts to one another.

The input interface 104 is connected to an X-axis photodetector 17, a Y-axis photodetector 19, a right click switch 231, and a left click switch 232, as in the prior art. The A/D converter 90 is connected to the upper electrodes 448a and 448b of the upper film 443.

The output interface 105 is connected to the bases of four switching transistors Q1 to Q4. The collectors of the transistors Q1 and Q2 are connected to the DC power source Vcc. The emitter of the transistor Q1 is connected to the lower electrode 449a, and the emitter of the transistor Q2 is connected to the lower electrode 449c.

The emitters of the transistors Q3 and Q4 are grounded. The collector of the transistor Q3 is connected to the lower electrode 449*b*, and the collector of the transistor Q4 is connected to the lower electrode 449*d*.

Figure 14:
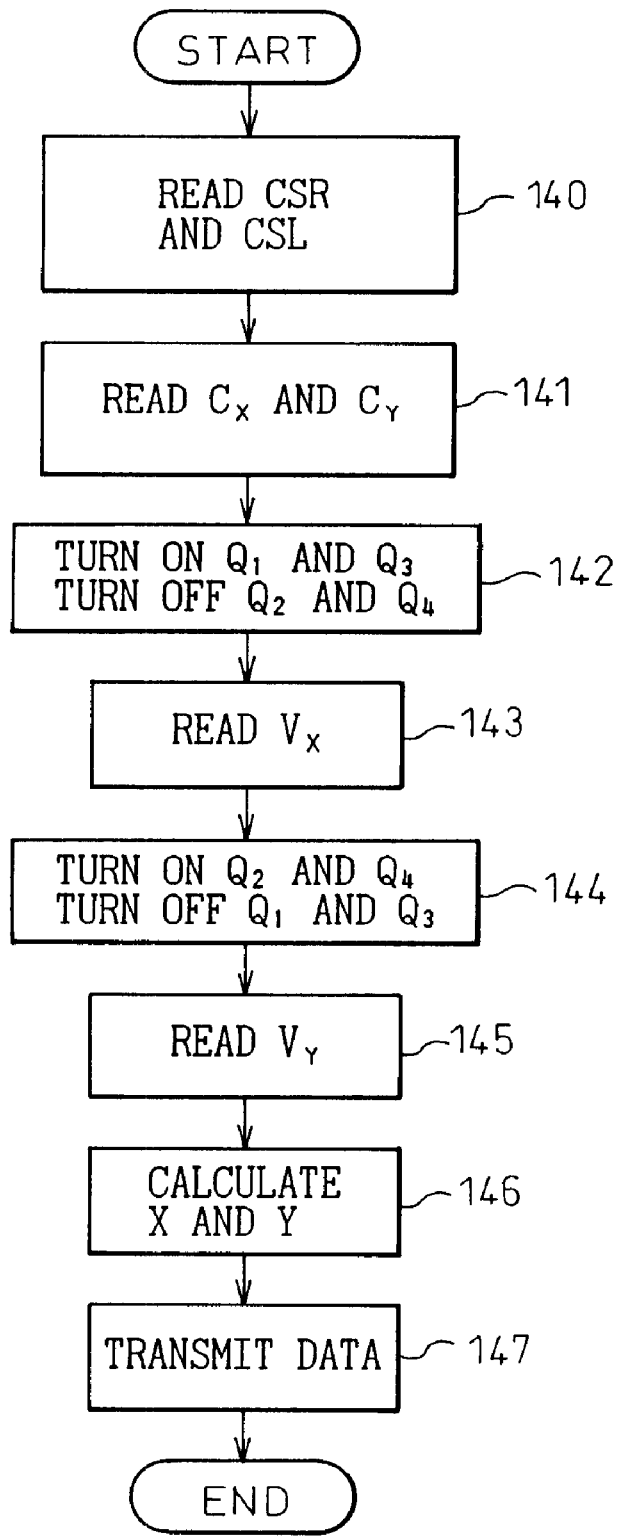
FIG. 14 shows a detecting routine of the mouse of the first embodiment.

FIG. 14 shows a detecting routine carried out as an interrupt at regular intervals by the controller 100.

Step 140 reads ON/OFF statuses CSL and CSR of the right and left click switches 231 and 232. If the left click switch 232 is ON, the status CSL is "1," and if OFF, "0." If the right click switch 231 is ON, the status CSR is "1," and if OFF, "0."

Step 141 reads the rotation of the ball 10, i.e., movements Cx and Cy of the mouse 40 from a counter incorporated in the input interface 104.

Step 142 turns on the transistors Q1 and Q3 and off the transistors Q2 and Q4. Step 143 reads a voltage Vx in the X-direction of the touch panel 44 through the A/D converter 90.

Step 144 turns the transistors Q2 and Q4 on and the transistors Q1 and Q3 off. Step 145 reads a voltage Vy in the Y-direction of the touch panel 44 through the A/D converter 90.

Step 146 calculates the coordinates X and Y of a pushed position on the touch panel 44. Step 147 transmits to a PC the statuses CSL and CSR of the left and right click switches 232 and 231, the movements Cx and Cy of the mouse 40, and the coordinates X and Y of the pushed position of the touch panel 44. Then, the routine ends.

Figure 15:
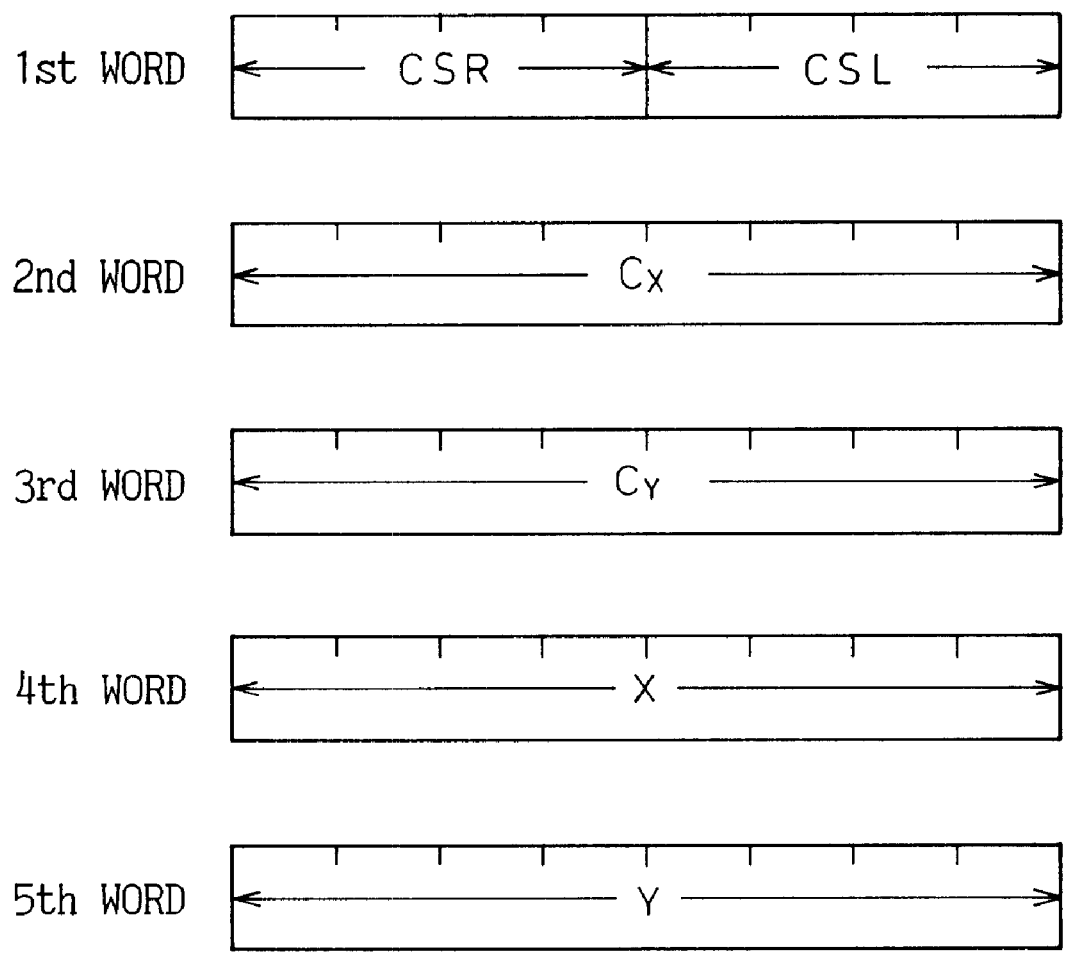
FIG. 15 shows a data transfer format of the mouse of the first embodiment.

FIG. 15 shows an example of a data format transmitted to a PC. The format consists of five words each made of eight bits.

The first word is divided into two sections each of four bits. The first four bits store the left click switch status CSL, and the second four bits store the right click switch status CSR.

The second word stores a movement Cx in the X-direction of the mouse, and the third word stores a movement Cy in the Y-direction of the mouse. The fourth word stores the coordinate X of a pushed position, and the fifth word stores the coordinate Y of the pushed position. These five words are transferred as serial data to a PC at regular intervals.

Figure 16:
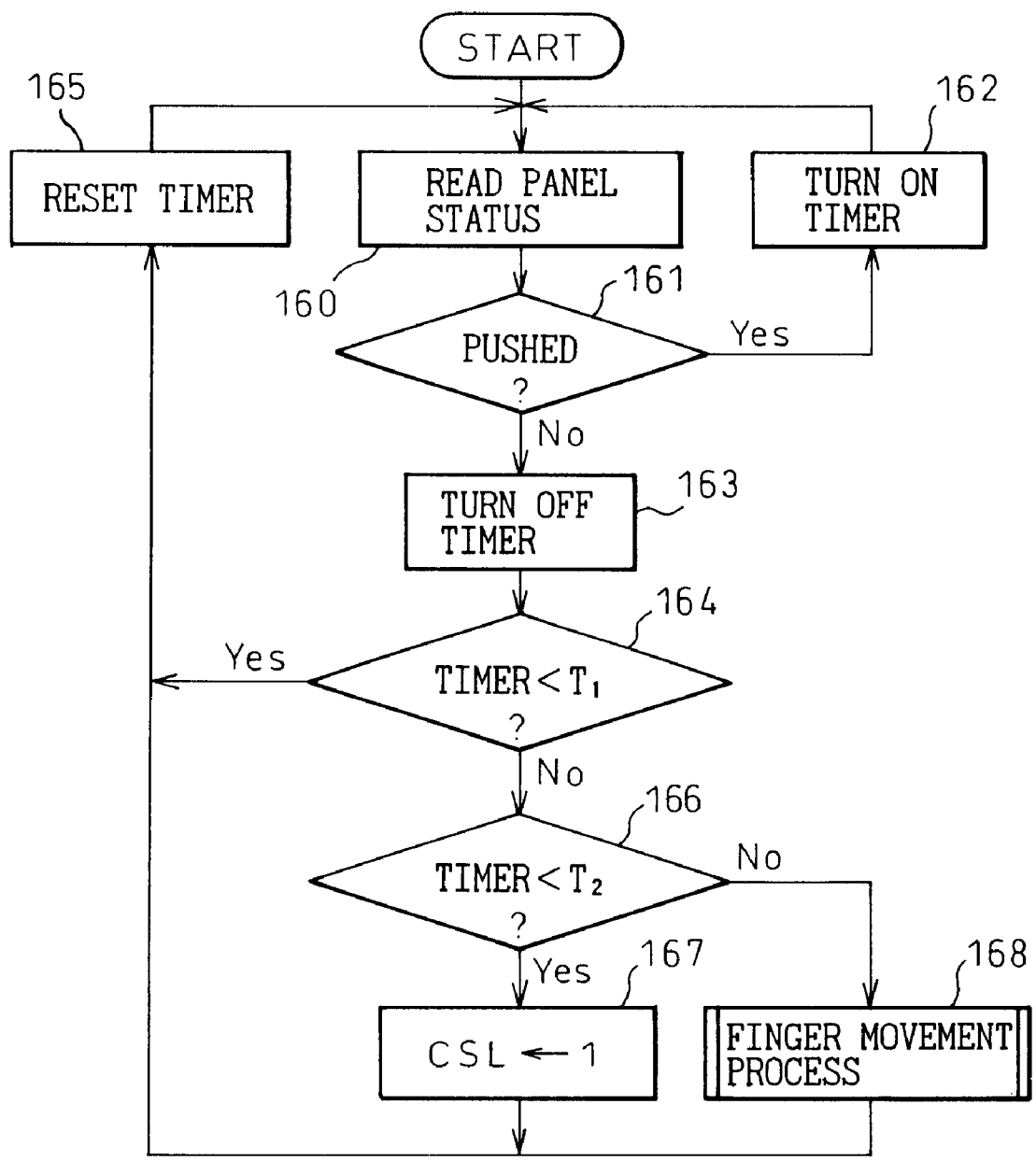
FIG. 16 shows a touch panel processing routine of the mouse of the first embodiment.

FIG. 16 shows a touch panel processing routine executed by the controller 100. Step 160 reads the state of the touch panel 44, and step 161 checks to see if the touch panel 44 is pushed with a finger.

If true, step 162 starts a timer, and the flow returns to step 160.

If step 161 is false, step 163 turns off the timer.

Step 164 checks to see if the timer is below a first threshold T1. If true, step 165 resets the timer, and the flow returns to step 160.

If the timer is above the first threshold T1 in step 164, step 166 checks to see if the timer is below a second threshold T2.

If true, step 167 sets, for example, the left click switch status CSL to "1," and the flow goes to step 165.

If the timer is above the second threshold T2 in step 166, step 168 carries out a finger movement process, and the flow goes to step 165.

Figure 17:
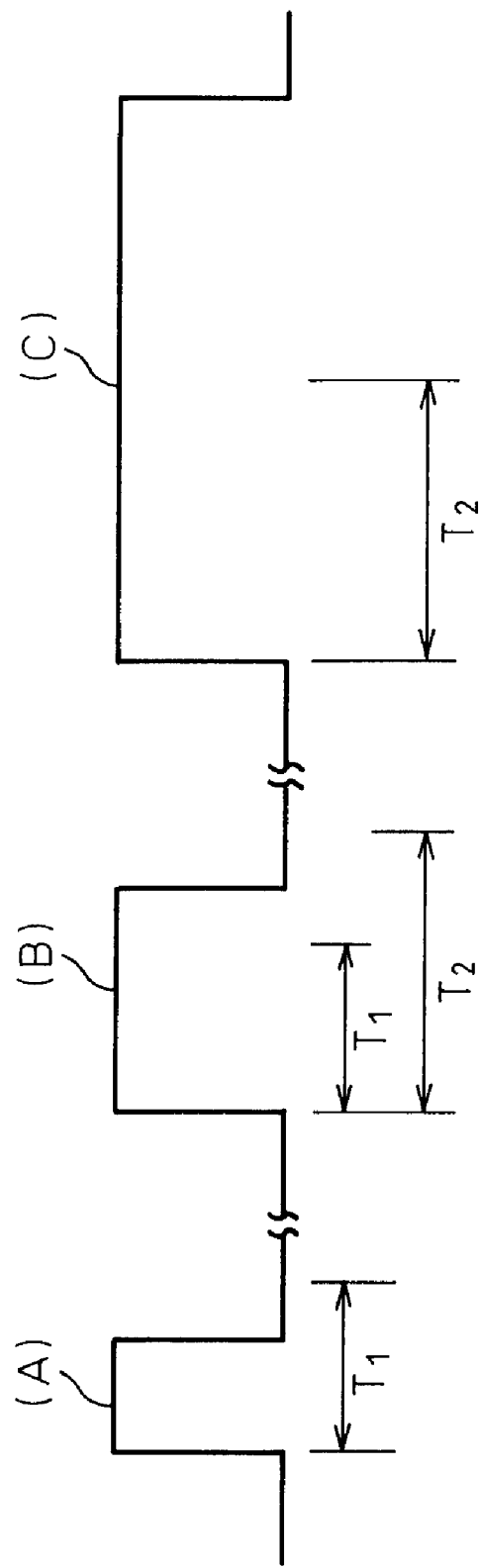
FIG. 17 shows touch panel operation timing of the mouse of the first embodiment.

FIG. 17 shows the timing of operations on the touch panel 44. (A) of FIG. 17 shows that a time of contact to the touch panel 44 is less than the first threshold T1. In this case, the touch is determined to be erroneous and is ignored. (B) of FIG. 17 shows that touching time is greater than the first threshold T1 and smaller than the second threshold T2. In this case, the touch is handled as a tapping operation, i.e., it is treated as a clicking operation on, for example, the left click switch. (C) of FIG. 17 shows that the touching time is longer than the second threshold T2. This is treated as, for example, a scroll command.

Figure 18:
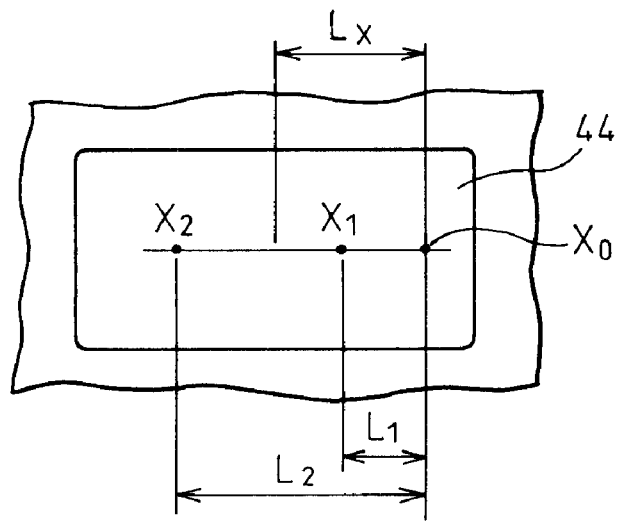
FIG. 18 shows a scroll command entering operation on the touch panel of the first embodiment.

FIG. 18 explains an X-direction scroll command entered on the touch panel 44. An X-coordinate X0 represents a previous position pushed by a finger and transmitted to a PC. A pushed position of this time has an X-coordinate of X1 or X2.

$$L1 = X1 - X0 < Lx$$

$$L2 = X2 - X0 > Lx$$

If the coordinate of this time is close to the previous coordinate, software incorporated in the PC determines that no operation command was entered to the touch panel, and if the coordinate of this time is far from the previous coordinate, the software determines that an operation command was entered to the touch panel and executes a corresponding operation such as a scroll operation.

Figure 19:
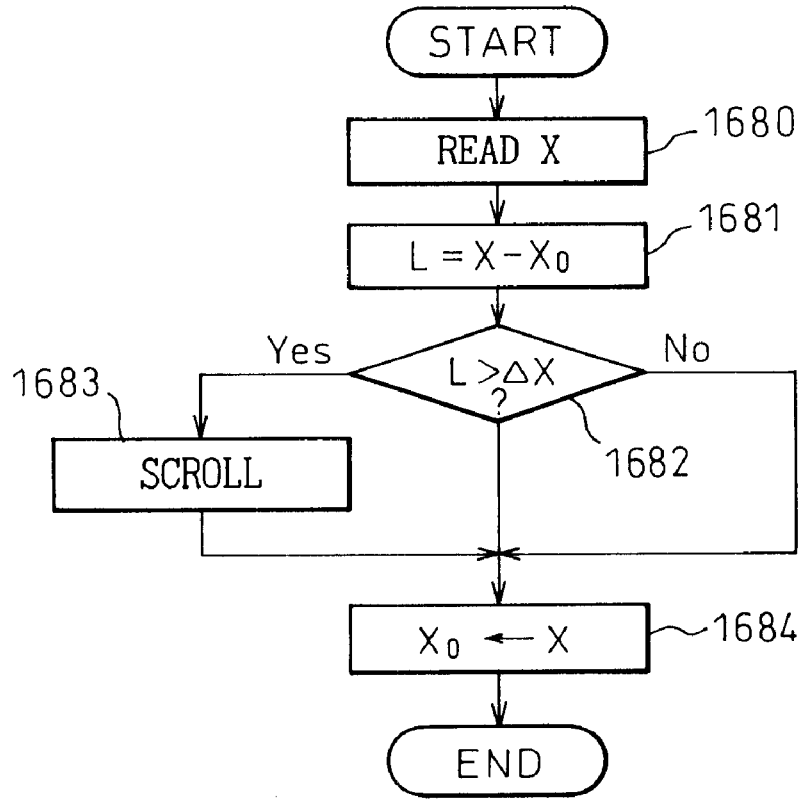
FIG. 19 shows a finger movement processing routine of the mouse of the first embodiment.

FIG. 19 shows a finger movement processing routine carried out in step 168 of FIG. 16. Step 1680 reads the X-coordinate of a pushed position of this time. Step 1681 calculates a difference L between the coordinate of this time and the previous coordinate X0.

Step 1682 checks to see if the difference L is above a threshold $\Delta x$ (or Lx). If true, step 1683 carries out a scroll operation, and if false, the flow goes to step 1684.

Step 1684 sets the coordinate X of this time to the previous coordinate X0, and the routine ends.

The first embodiment arranges the touch panel between the two click switches of a mouse. On the other hand, the second embodiment eliminates the click switches from a mouse, arranges a touch panel on the whole face of the key top of the mouse, and uses the touch panel by dividing it into sections.

Figure 20:
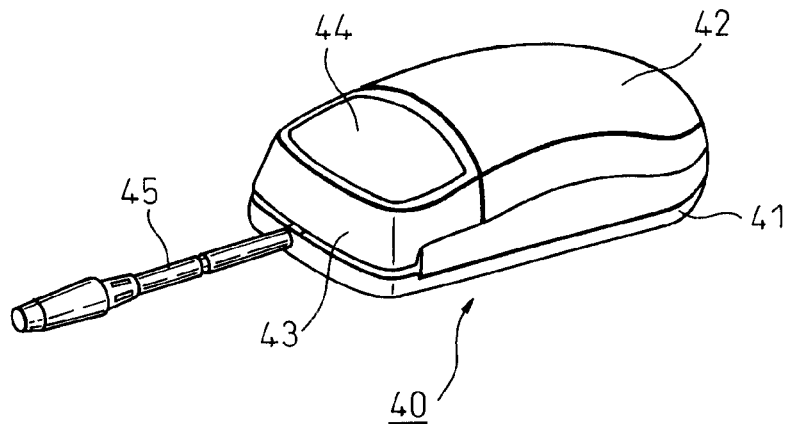
FIG. 20 shows a mouse according to a second embodiment of the present invention.
Figure 21:
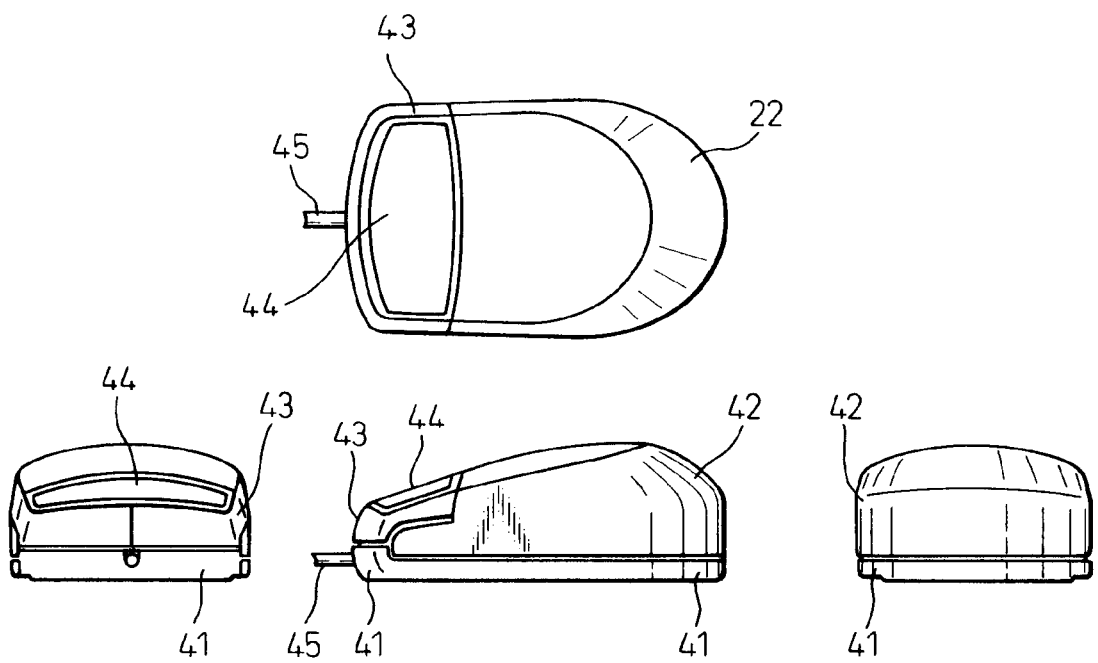
FIG. 21 shows four sides of the mouse of the second embodiment.

FIG. 20 shows a mouse 40 according to the second embodiment, and FIG. 21 shows four sides of the mouse. A window is formed on the whole face of a key top 43 of the mouse, and a touch panel 44 serving as a control surface is arranged in the window. A cable 45 transmits operation signals from the mouse 40 to a PC.

Figure 22:
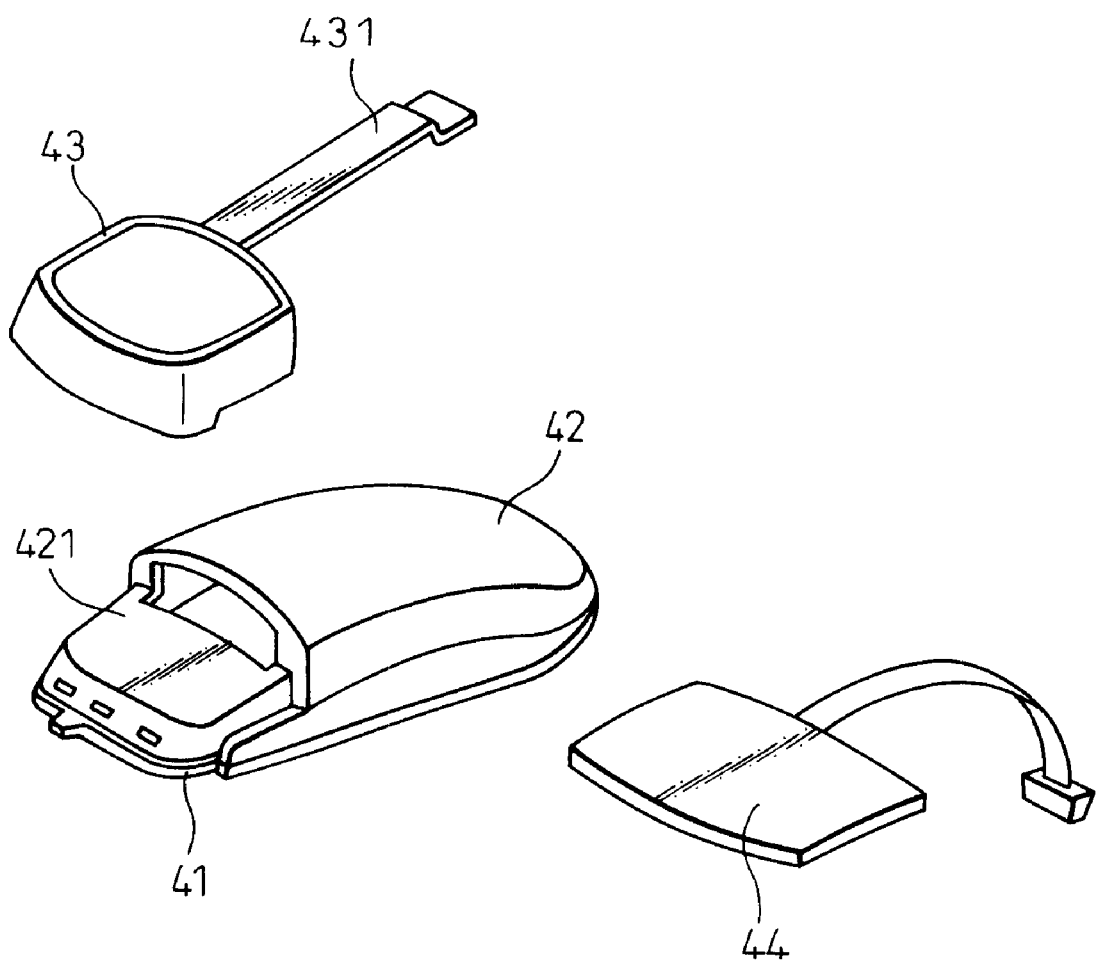
FIG. 22 shows an exploded view of the mouse of the second embodiment.

FIG. 22 shows an exploded view of the mouse 40. The touch panel 44 is installed on a support 421 that is formed at the front center of an upper case 42. The key top 43 covers the support 421, thereby fixing the touch panel 44.

Figure 23:
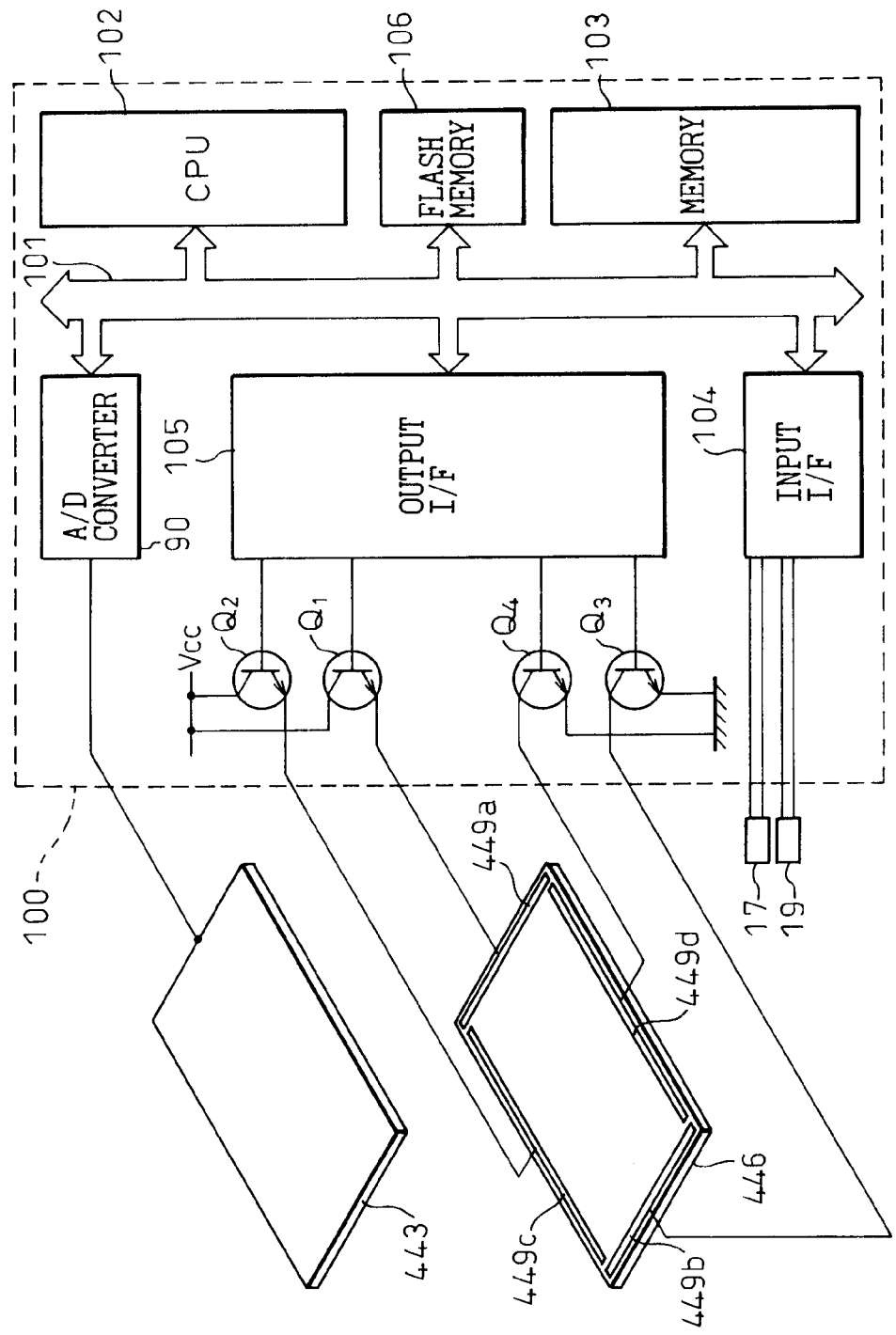
FIG. 23 shows a structure of the mouse of the second embodiment.

FIG. 23 shows a structure of the mouse 40 of the second embodiment. The difference from the first embodiment is that an input interface 104 is connected to only an X-axis photodetector 17 and a Y-axis photodetector 19 and that there is a flash memory 106 for storing touch panel settings.

Figure 24:
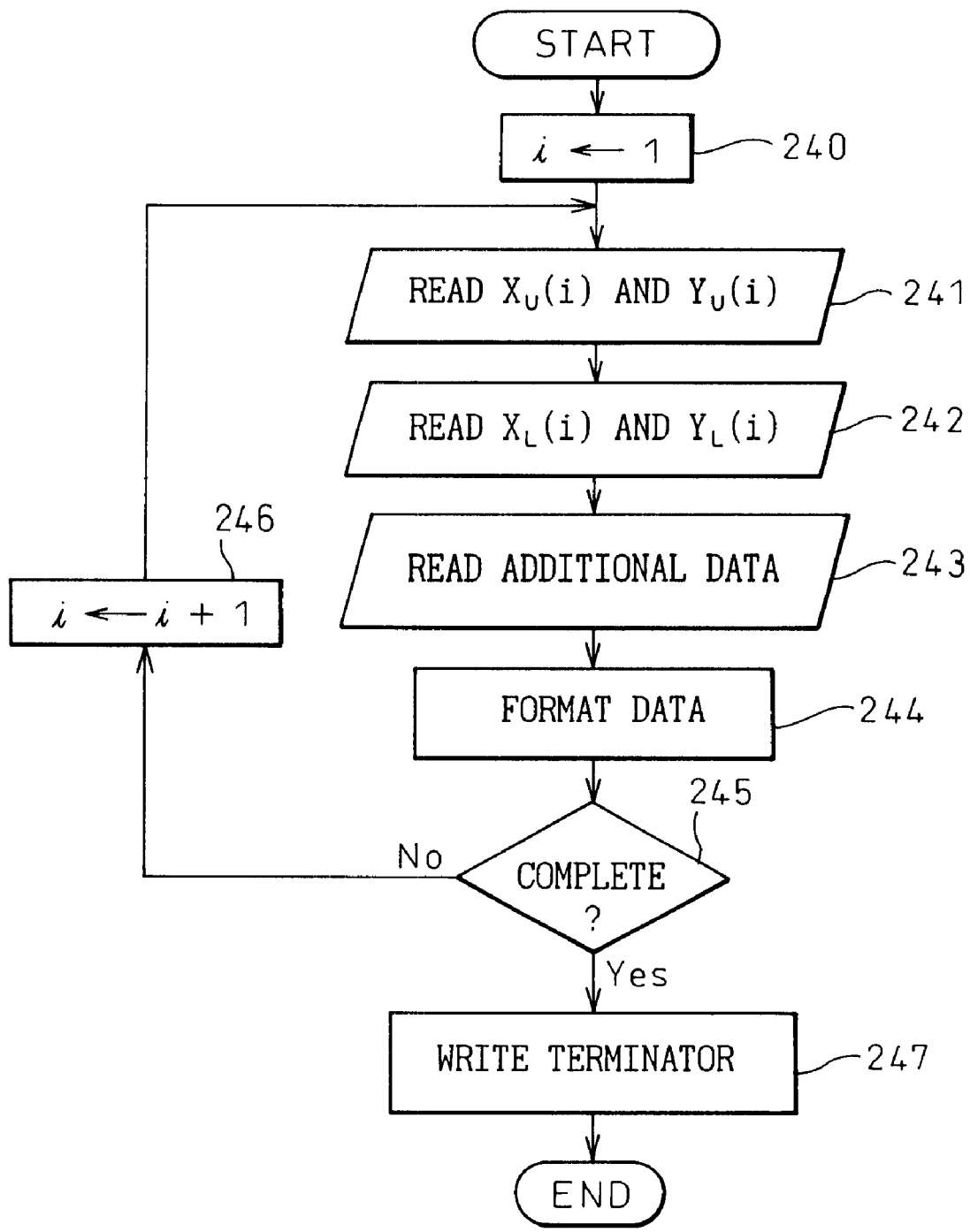
FIG. 24 shows a touch panel setting routine of the mouse of the second embodiment.

FIG. 24 shows a touch panel setting routine carried out by PC. Step 240 sets a section number index i to "1."

Step 241 reads the upper left coordinates {Xu(i), Yu(i)} of the section i defined on the touch panel 44, and step 242 reads the lower right coordinates {XL(i), YL(i)} of the section i. If required, step 243 sets a correction coefficient C(i) that relates an operation on the touch panel 44 to an operation on the PC.

Step 244 formats the data for the section i. Step 245 determines whether or not the setting of the touch panel 44 is complete.

If false, step 246 increments the index i by one, and the flow returns to step 241.

If step 245 is true, step 247 writes a terminator in the format, and the routine ends.

FIG. 25 shows a GUI used by the routine of FIG. 24 for setting the touch panel 44. (A) of FIG. 25 defines sections on the touch panel 44, and (B) of FIG. 25 sets functions for the sections. To define a section on the touch panel 44, one drags a cursor displayed on a screen from an upper left part to a lower right part as shown in (A) of FIG. 25. (B) of FIG. 25 determines a function assigned to the section, i.e., whether the section is used as a switch or a movement detector. If the section is used as a movement detector, a resolution must also be set.

Figure 26:
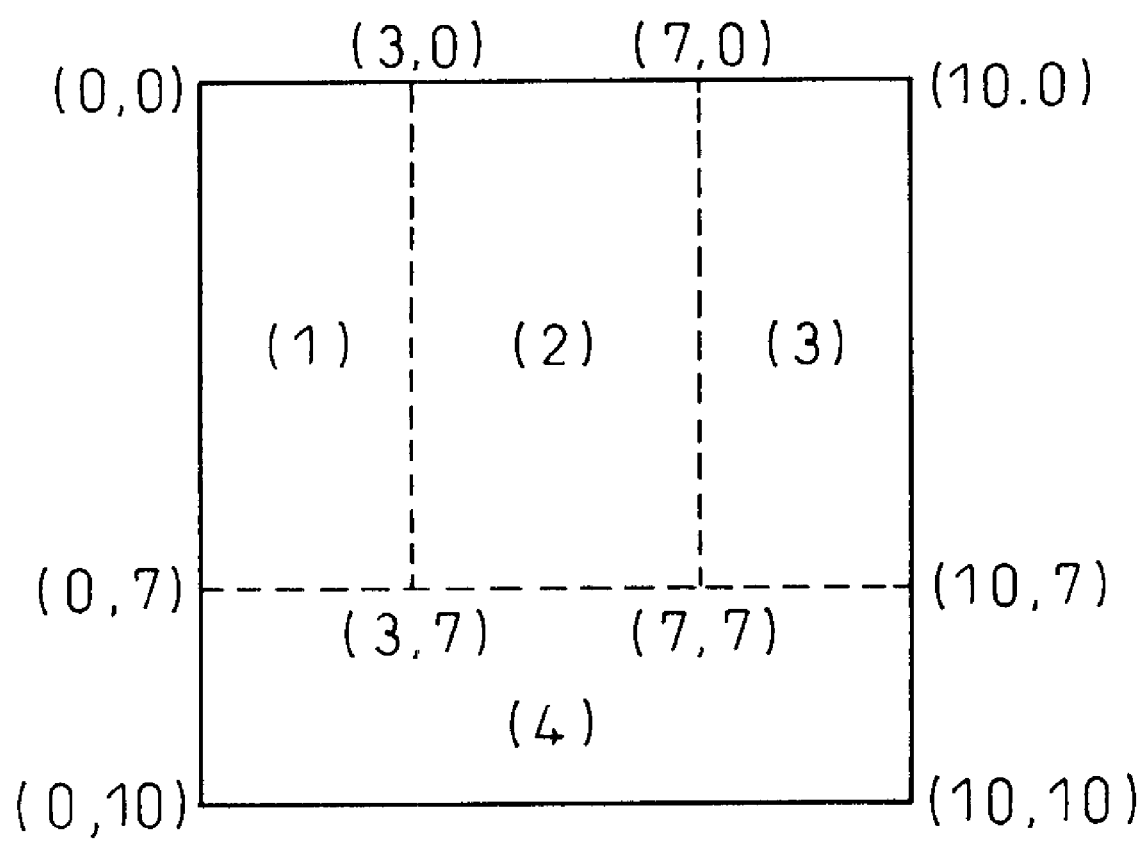
FIG. 26 shows examples of sections defined on the touch panel of the second embodiment.

FIG. 26 shows an example of the setting of the touch panel 44. The touch panel 44 is divided into four sections (1) to (4). The section (1) is used as a left click switch, the section (2) as a vertical scroll section, the section (3) as a right click switch, and the section (4) as a horizontal scroll section.

FIG. 27 shows a data format for setting the touch panel of FIG. 26. The format consists of a one-word header, data for the sections 1 to 4, and a one-word terminator. The data for each section consists of six words, one for an upper left X-coordinate, one for an upper left Y-coordinate, one for a lower right X-coordinate, one for a lower right Y-coordinate, one for a section number, and one for a coefficient C(i). The coefficient C(i) is "0" to indicate that the corresponding section is used as an ON/OFF switch and is a positive number to indicate a gain.

Data shown in FIG. 27 indicates that the touch panel consists of 10 elements in vertical and horizontal directions. The data is transferred from the PC to the memory 106 of the controller 100 of the mouse.

At the time of shipment of the mouse, default values are directly written into the memory 106.

Figure 28:
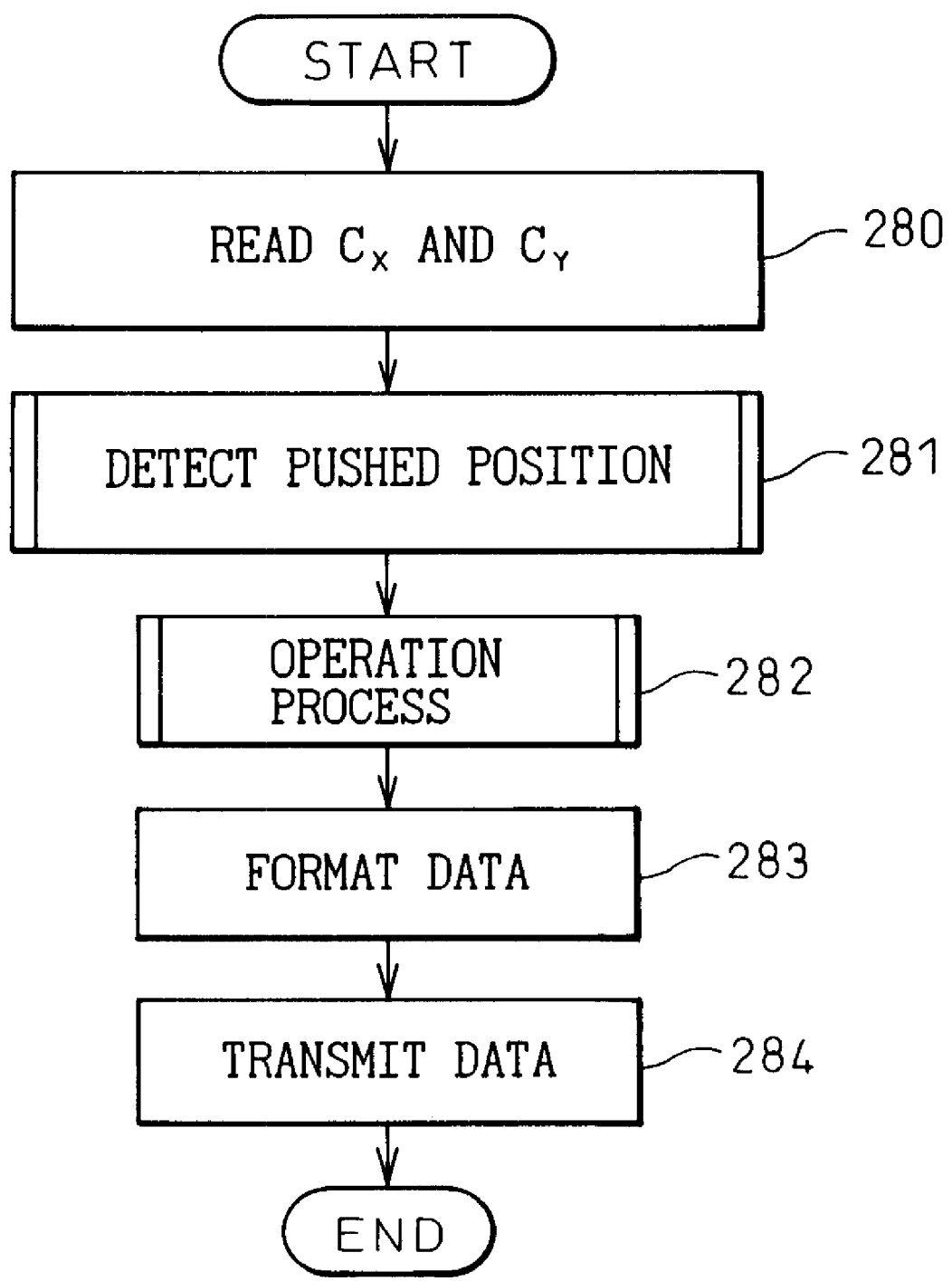
FIG. 28 shows a processing routine of the mouse of the second embodiment.

FIG. 28 shows a mouse processing routine carried out by the controller 100 of the mouse of the second embodiment. Step 280 reads the movement of the mouse, i.e., the movement of a mouse ball by reading counts Cx and Cy stored in a counter in the input interface 104.

Step 281 carries out a pushed position detecting routine, and step 282 executes an operation processing routine. The details thereof will be explained later.

Step 283 formats the data of the mouse, and step 284 transmits the formatted data to a PC. Then, the routine ends.

Figure 29:
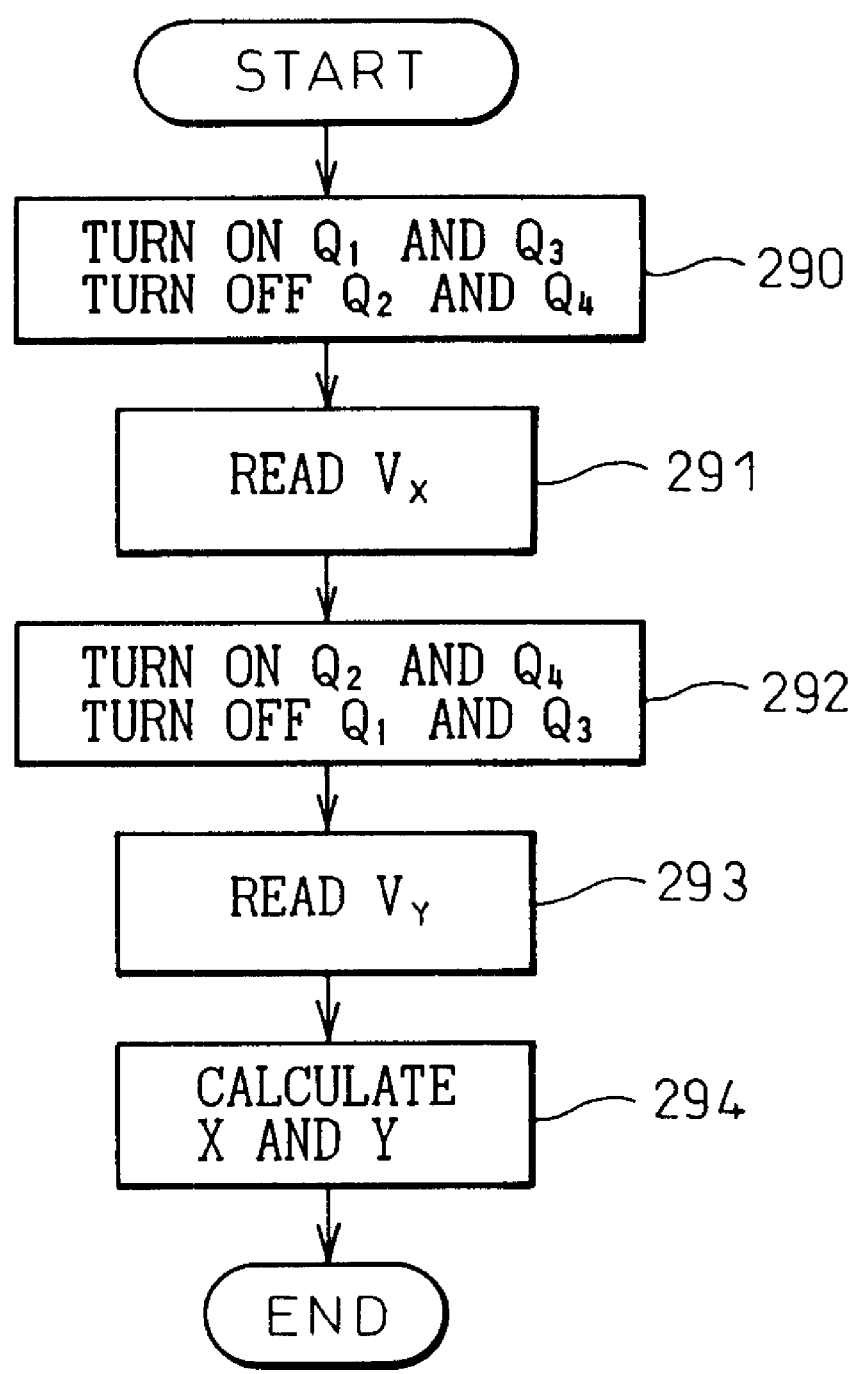
FIG. 29 shows a pushed position detecting routine of the mouse of the second embodiment.

FIG. 29 shows the pushed position detecting routine carried out in step 281 of FIG. 28. Step 290 turns transistors Q1 and Q3 on and transistors Q2 and Q4 off, of the controller 100 (FIG. 23). Step 291 reads an X-direction voltage Vx from the touch panel 44 through an A/D converter 90.

Step 292 turns the transistors Q2 and Q4 on and the transistors Q1 and Q3 off. Step 293 reads a Y-direction voltage Vy from the touch panel 44 through the A/D converter 90. Step 294 calculates the coordinates X and Y of the pushed position on the touch panel 44, and the routine ends.

Figure 30:
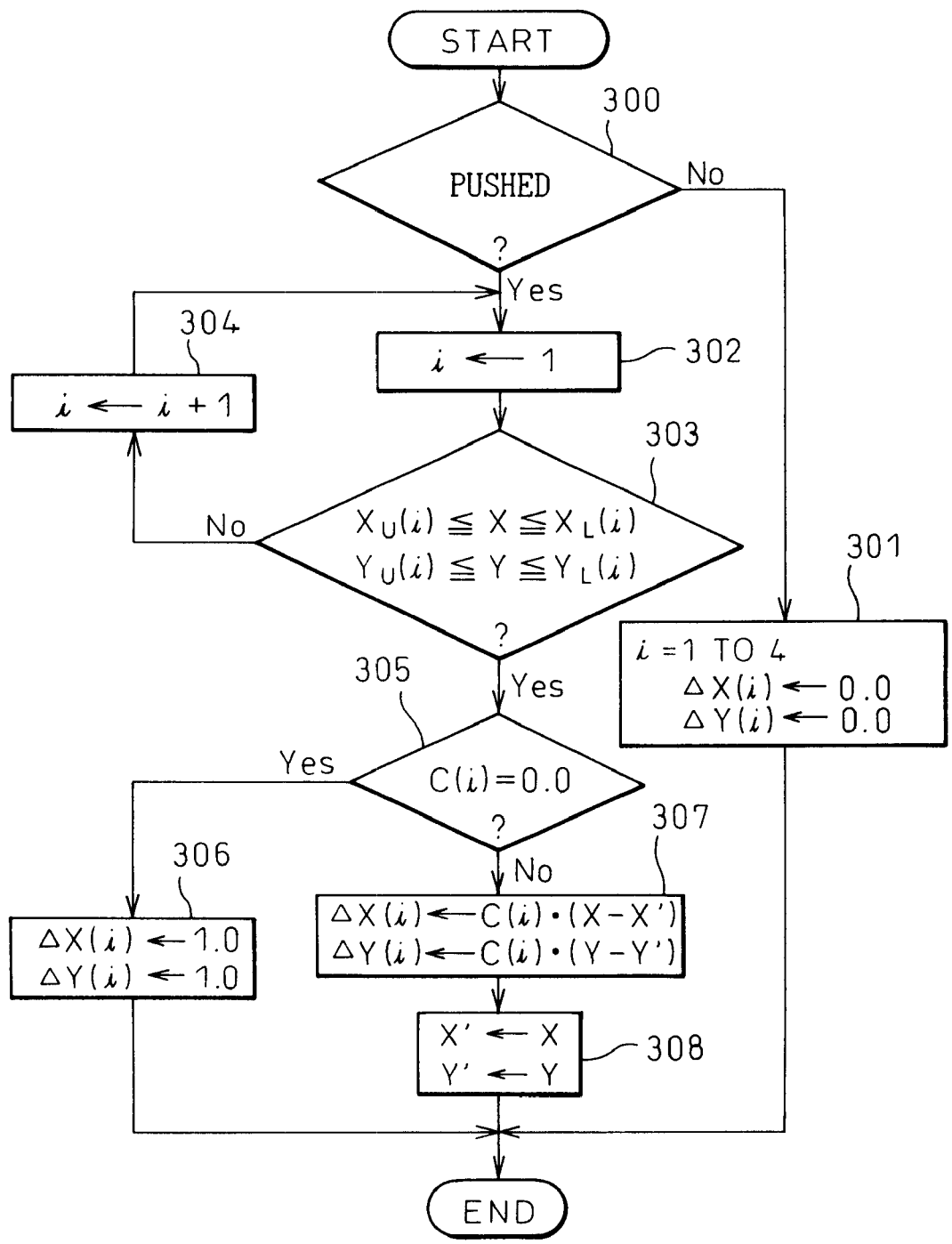
FIG. 30 shows an operation processing routine of the mouse of the second embodiment.

FIG. 30 shows the operation processing routine carried out in step 282 of FIG. 28. Step 300 checks to see if the pushed position detecting routine has detected a pushed position.

If false, step 301 resets outputs ΔX(i) and ΔY(i) of this routine for the sections 1 to imax (4 in this embodiment) as follows:

$\Delta X(i) \leftarrow 0.0$ $\Delta Y(i) \leftarrow 0.0$

Then, the routine ends. If step 300 is true to indicate that a pushed position has been detected, step 302 sets the section index i to "1."

Step 303 checks to see if the pushed position is in the section i as follows:

$Xu(i) \leq X \leq XL(i)$, and $Yu(i) \leq Y \leq YL(i)$

If step 303 is false to indicate that the pushed position is not in the section i, step 304 increments the index i by one, and the flow returns to step 302.

If step 303 is true to indicate that the pushed position is in the section i, step 305 checks to see if the coefficient C(i) is 0.0.

If C(i)=0.0, the section i is used as a switch, and step 306 sets the outputs ΔX(i) and ΔY(i) of this routine each to "1.0" to indicate that the switch is ON. Then, the routine ends.

If C(i)=1.0 in step 305, the section i is for a cursor operation. Accordingly, step 307 calculates the outputs ΔX(i) and ΔY(i) of this routine as follows:

$\Delta X(i) \leftarrow C(i) \cdot (X - X')$ $\Delta Y(i) \leftarrow C(i) \cdot (Y - Y')$ where (X', Y') are the coordinates of the previous pushed position.

Step 308 updates the previous pushed position as follows:

$X' \leftarrow X$ $Y' \leftarrow Y$

Then, the routine ends.

Figure 31:
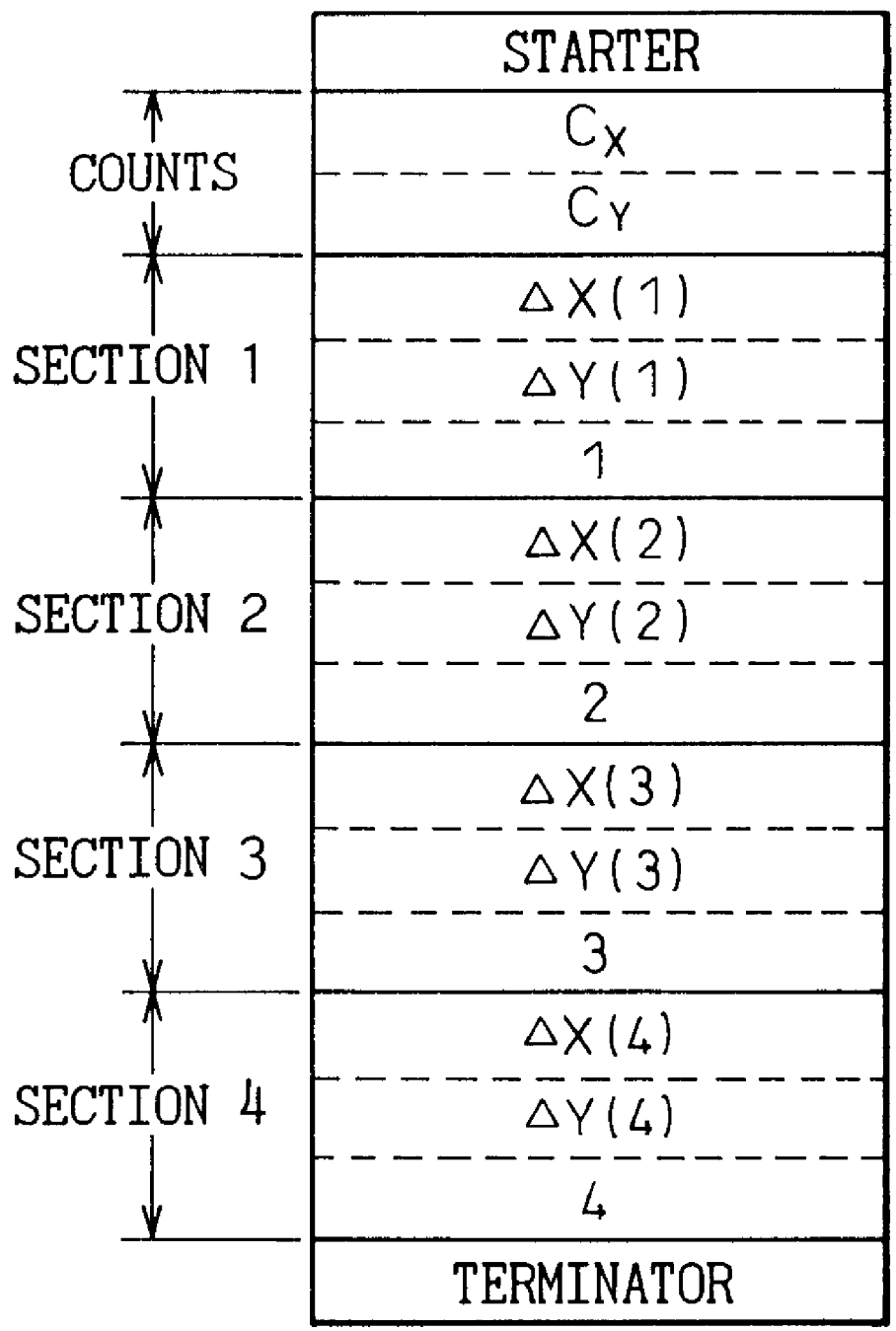
FIG. 31 shows a data format for operations of the mouse of the second embodiment.

FIG. 31 shows a format of data representing the operations of the mouse of the second embodiment. The format consists of a header, the rotation (Cx, Xy) of the mouse ball, the outputs ΔX(i) and ΔY(i) of the four sections of the touch panel 44, and section numbers i. The formatted data is transmitted from the mouse to a PC.

The mice of the first and second embodiments are usually manipulated without seeing them. Accordingly, it is convenient if one can sense the movement of one's finger on the touch panel 44.

Figure 32:
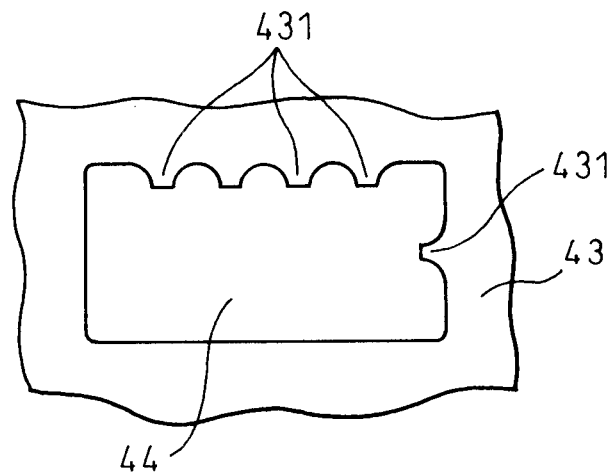
FIG. 32 shows a touch panel structure (1) applicable to the mice of the present invention.

FIG. 32 shows an example of a touch panel 44 applicable to the mice of the present invention. A window frame of a key top 43 that fixes the touch panel 44 is provided with protrusions 431 so that one may sense the movement of one's finger by touching the protrusions 431 with one's finger.

Figure 33:
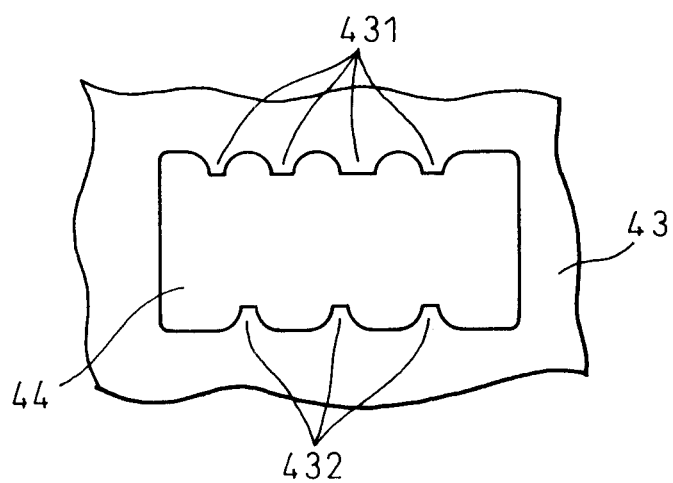
FIG. 33 shows a touch panel structure (2) applicable to the mice of the present invention.

FIG. 33 shows another example of a touch panel 44 applicable to the mice of the present invention. A window frame of a key top 43 is provided with protrusions 431 and 432 formed on opposite sides of the window frame at different pitches so that one may sense the movement of one's finger at the different pitches.

Figure 34:
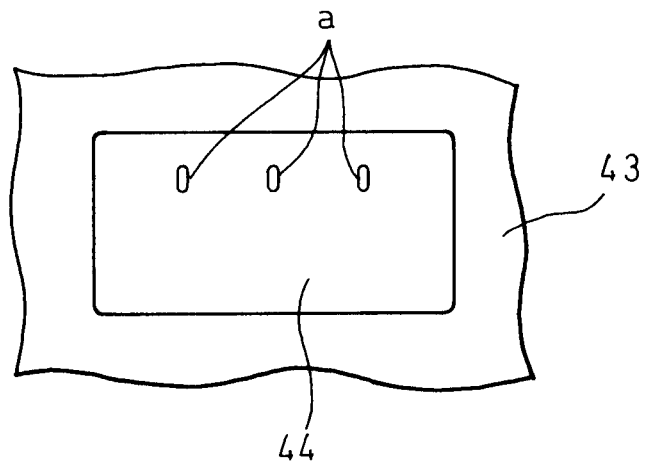
FIG. 34 shows a touch panel structure (3) applicable to the mice of the present invention.

FIG. 34 shows still another example of a touch panel 44 applicable to the mice of the present invention. The top face of an elastic film 441 of the touch panel 44 is provided with protrusions or recesses "a."

The mice with the touch panel of the present invention must correctly detect a pushed position.

Touch panels usually involve errors in printing electrode patterns, fluctuations in the resistance of the electrode patterns, fluctuations in the resistance of electric contacts, and unevenness in resistance films to deteriorate the detection accuracy of a pushed position and vary a scrolling speed.

To suppress these fluctuations, the controller 100 (FIGS. 13 and 23) may monitor the voltage Vcc applied to the touch panel 44 and corrects a fluctuation in the voltage by software.

This technique, however, needs additional contact circuits, A/D converters, etc. Namely, this technique is not achievable by the controller 100 alone. To solve this problem, a corrector for correcting installation errors must be incorporated in the mouse.

Figure 35:
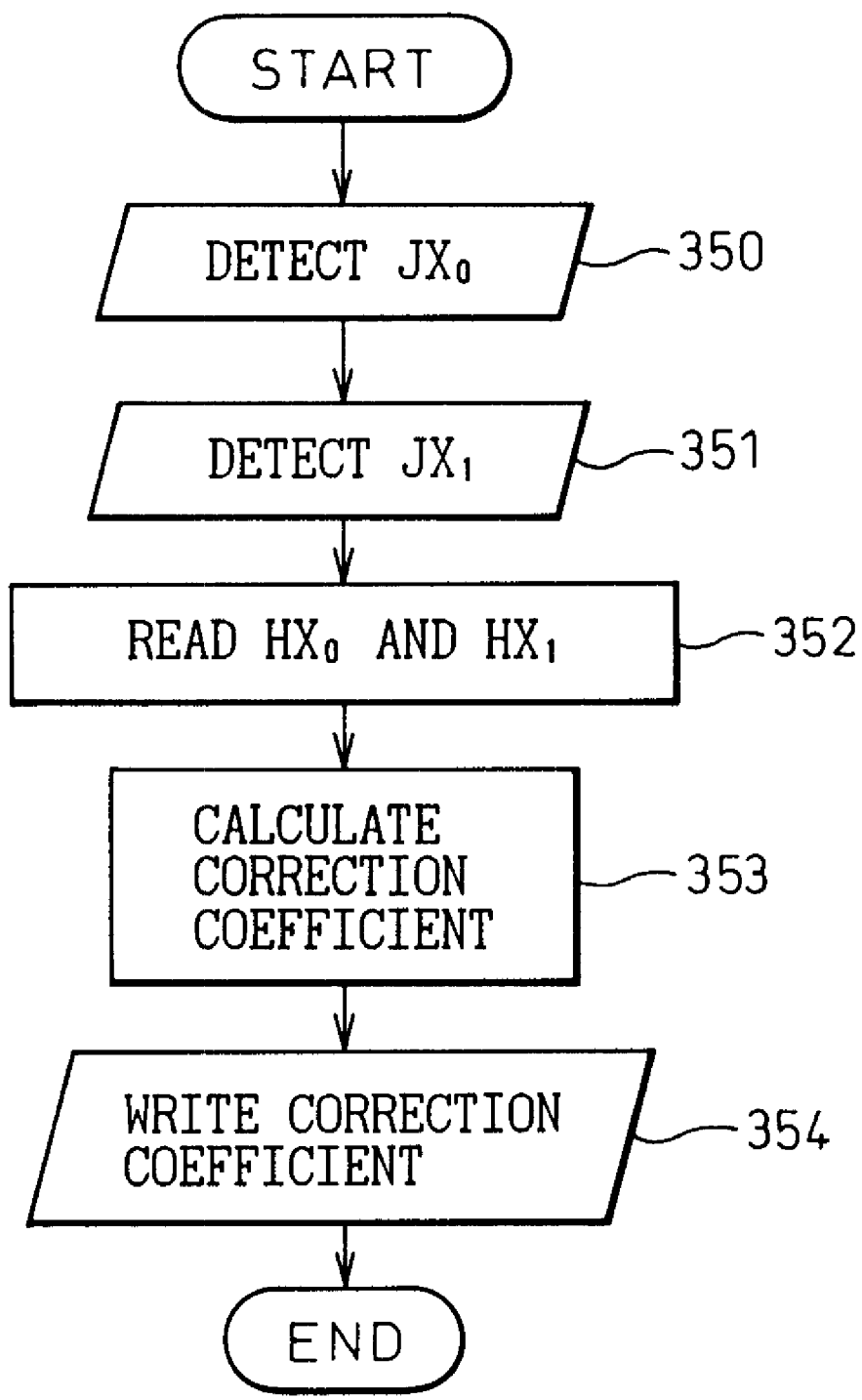
FIG. 35 shows a correction coefficient calculating routine according to the present invention.

FIG. 35 shows a correction coefficient calculating routine carried out when a mouse is shipped. This routine is carried out by a PC that is connected to the mouse.

Step 350 detects a top edge value JX0 when the top edge of a touch panel of the mouse is pushed.

Step 351 detects a bottom edge value JX1 when the bottom edge of the touch panel is pushed.

Step 352 reads a theoretical top edge value HX0 and a theoretical bottom edge value HX1.

The theoretical and detected values are expressed with linear functions as follows:

$$a \cdot JX0+b=HX0$$

$$a \cdot JX1+b=HX1$$

Step 353 calculates correction coefficients a and b as follows:

$$a \leftarrow (HX0-HX1)/(JX0-JX1)$$

$$b \leftarrow HX0-JX0 \cdot (HX0-HX1)/(JX0-JX1)$$

Step 354 writes the correction coefficients a and b into the memory 106 (FIG. 23), and the routine ends.

Figure 36:
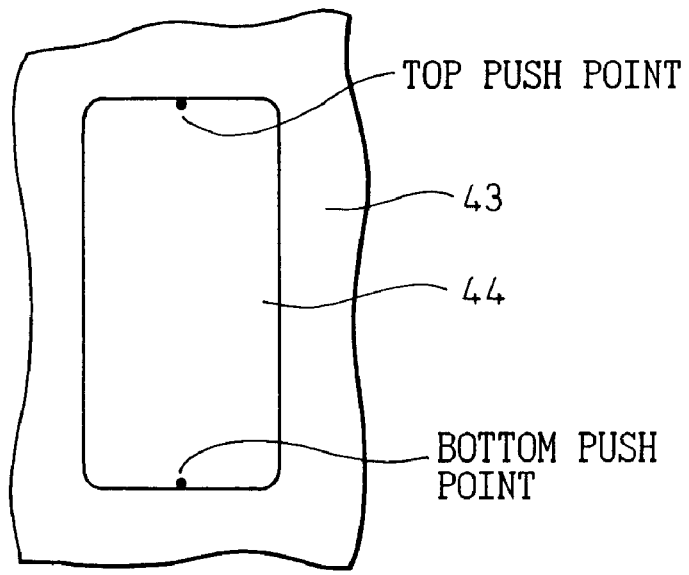
FIG. 36 shows examples of pushed positions on a touch panel according to the present invention.

FIG. 36 shows top and bottom edge points to be pushed for correction of a touch panel. These points are usually along the top and bottom edges of a window of the touch panel.

Figure 37:
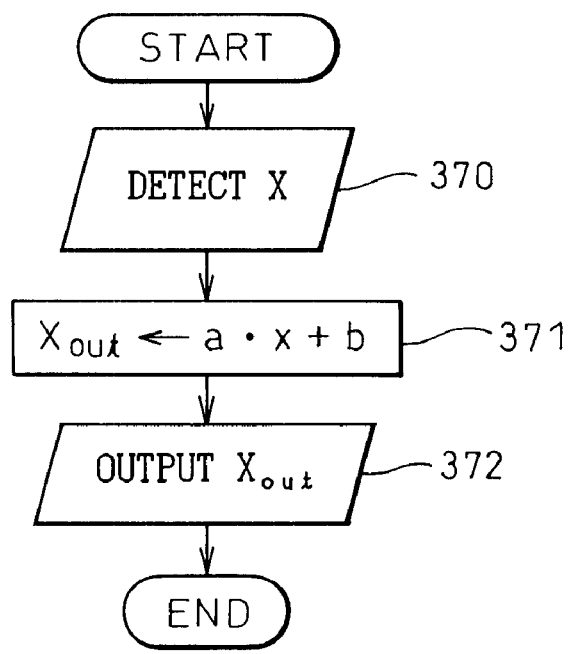
FIG. 37 shows a pushed position correcting routine according to the present invention.

FIG. 37 shows a pushed position correcting routine carried out by the controller 100 of the mouse. Step 370 detects the coordinate X of a pushed point on the touch panel.

Step 371 reads the correction coefficients a and b from the memory 106 and calculates a corrected coordinate Xout as follows:

$$X\text{out} \leftarrow a \cdot X + b$$

Step 372 transmits the corrected coordinate Xout to a PC, and the routine ends.

The correction coefficients provided by the correction coefficient calculating routine may be written into a nonvolatile memory, e.g., a hard disk unit of the PC, so that the PC may execute the pushed position correcting routine to correct a pushed position transmitted from the mouse.

This error correction technique is applicable not only to the linear detection of a pushed position as in the above embodiments but also to the two-dimensional detection of a pushed position.

It is possible to employ different correction coefficients for sections defined on a touch panel, respectively. It is also possible to divide a touch panel into left and right sections with the left section being provided with a resolution of 200 and the right section with a resolution of 400. In this case, the right section provides a scroll speed of two times faster than that of the left section with respect to the same movement of a finger on the touch panel.

Although the embodiments relate to mice that detect the movements thereof based on the rotation of a ball, the present invention is also applicable to optical mice that count the number of regular grids printed on a base when being moved across the base.

As explained above in detail, the present invention provides a mouse for a computer, having a touch detector with a touch panel. The first aspect of the present invention enables the mouse to send commands to the computer according to not only the movement or click operation of the mouse but also the movement of a finger on the touch panel.

The second aspect of the present invention enables the mouse to send different commands to the computer depending on a finger touching period on the touch panel.

The third aspect of the present invention enables the mouse to issue a command corresponding to a tapping operation if a finger touching period on the touch panel is shorter than a threshold.

The fourth aspect of the present invention enables the mouse to issue one of at least two instructions to the computer depending on the movement of a finger on the touch panel if a finger touching period on the touch panel is longer than a threshold.

The fifth and sixth aspects of the present invention simplify the structure of the mouse by employing the touch panel instead of click switches.

The seventh aspect of the present invention properly divides the touch panel into sections so that different commands may be issued from the sections.

The eight aspect of the present invention enables the mouse to use the sections of the touch panel as switches and movement detectors.

The ninth aspect of the present invention fixes the touch detector with a support that is integral with an upper case of the mouse and with a window frame of a key top of the mouse, thereby simplifying the assembling processes of the mouse.

The tenth aspect of the present invention fixes the touch detector to the support when the key top and upper case are assembled together, thereby simplifying the assembling processes of the mouse.

The eleventh aspect of the present invention forms the touch detector as a discrete part, thereby allowing the shape of the upper case of the mouse to be freely designed.

The twelfth aspect of the present invention fixes the touch detector to a backing plate when the backing plate and a window frame are assembled together, thereby simplifying the assembling processes of the mouse.

The thirteenth aspect of the present invention enables the mouse to prevent a deposition of dust on the touch detector.

The fourteenth aspect of the present invention enables a user of the mouse to sense the movement of a user's finger on the touch panel by touching protrusions of the touch panel without seeing the touch panel.

The fifteenth aspect of the present invention enables a user of the mouse to sense the movement of a user's finger on the touch panel at two intervals.

The sixteenth aspect of the present invention enables a user of the mouse to sense the movement of a user's finger on the touch panel by touching protrusions on the touch panel without seeing the touch panel.

The seventeenth aspect of the present invention enables the mouse to correct installation errors of the touch detector by correcting a pushed position on the touch panel according to a correction coefficient.

What is claimed is:

1. A movable mouse for a computer, comprising:
    movement detecting means for detecting movement of the mouse;
    operation detecting means for detecting operation of click switches of the mouse;
    a touch panel defined by a continuous irregular edge formed in a key top on the movable mouse and having a control surface extending substantially to the edge that detects a touched point on the control surface, wherein said irregular edge includes at least one protrusion serving to assist the user in locating the touched point in terms of coordinates on the control surface; and
    transmitting means for transmitting a set of commands, prepared from the detected movement, operation, and touched state, to the computer.

2. The mouse as recited in claim 1, wherein the at least one protrusion is an indentation into the edge of the touch panel.

3. The mouse as recited in claim 1, wherein the at least one protrusion is a plurality of protrusions spaced by a constant interval.

4. The mouse, as recited in claim 1, wherein the at least one protrusion is a plurality of protrusions spaced by different intervals.

5. A movable mouse for a computer, comprising:

movement detecting means for detecting a movement of the mouse;

operation detecting means for detecting operation of click switches of the mouse;

a touch panel defined by a continuous irregular edge formed in a key top on the movable mouse and having a control surface extending substantially to the edge that detects a touched point on the control surface, wherein said irregular edge includes at least on first protrusion located at a first portion of the edge of the touch panel and at least one second protrusion located at a second portion of the edge of the touch panel, said first and second protrusions serving to assist the user in locating the touched point in terms of coordinates on the control surface; and transmitting means for transmitting a set of commands, prepared from the detected movement, operation, and touched state, to the computer.

6. The mouse as recited in claim 5, wherein the touch panel is generally rectangular, and the first and second portions of the edges are opposite sides of the rectangular touch panel.

7. The mouse as recited in claim 5, wherein the touch panel is generally rectangular, and the first and second portions of the edges are adjacent sides of the rectangular touch panel.

8. The mouse as recited in claim 5, wherein the at least one protrusion is formed at a different pitch on the edge relative to the at least one second protrusion.

9. The mouse as recited in claim 5, wherein the at least one first protrusion is a plurality of protrusions spaced by a constant interval.

10. The mouse as recited in claim 5, wherein the at least one first protrusion is a plurality of protrusions spaced at respective different intervals.

11. The mouse as recited in claim 5, wherein the at least one second protrusion is a plurality of protrusions spaced by a constant interval.

12. The mouse is recited in claim 5, wherein the at least one second protrusion is a plurality of protrusions spaced at respective different intervals.

13. A movable mouse for a computer, comprising:

movement detecting means for detecting movement of the mouse;

operation detecting means for detecting operation of click switches of the mouse;

a touch panel, positioned on the movable mouse, and having a control surface that detects a touched point on the control surface, at least one protrusion or recess located adjacent an edge of the touch panel, and spaced from the control surface, said at least on protrusion or recess serving to assist the user in locating the touched point in terms of coordinates on the control surface; and transmitting means for transmitting a set of commands, prepared from the detected movement, operations, and touched state, to the computer.

14. The mouse as recited in claim 7, wherein the touch panel includes a top face that is an elastic film, and said at least one protrusion or recess is formed in the elastic film.

15. The mouse as recited in claim 13, wherein said at least one protrusion or recess is a plurality of protrusions or recesses spaced by a constant interval.

* * * * *